(12) United States Patent
Sohn et al.

(10) Patent No.: US 11,611,695 B2
(45) Date of Patent: Mar. 21, 2023

(54) IMAGING DEVICE AND ELECTRONIC DEVICE INCLUDING THE SAME

(71) Applicant: SAMSUNG ELECTRONICS CO., LTD., Suwon-si (KR)

(72) Inventors: Bongjin Sohn, Suwon-si (KR); Kyumin Kyung, Suwon-si (KR); Joonseok Kim, Suwon-si (KR); Seungchul Shin, Suwon-si (KR); Seoungjae Yoo, Suwon-si (KR); Inchun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 17/038,577

(22) Filed: Sep. 30, 2020

(65) Prior Publication Data
US 2021/0281752 A1 Sep. 9, 2021

(30) Foreign Application Priority Data
Mar. 5, 2020 (KR) .................. 10-2020-0027643

(51) Int. Cl.
H04N 5/232 (2006.01)
H04N 5/225 (2006.01)
(Continued)

(52) U.S. Cl.
CPC ......... *H04N 5/23229* (2013.01); *G01S 17/08* (2013.01); *G01S 17/89* (2013.01);
(Continued)

(58) Field of Classification Search
CPC ........ G01S 17/08; G01S 17/89; G01S 17/894; G01S 7/4863; G06T 2207/10028;
(Continued)

(56) References Cited

U.S. PATENT DOCUMENTS 4,446,484 A * 5/1984 Powell ...................... G06T 5/20
348/625
5,079,621 A * 1/1992 Daly .................... H04N 19/126
375/E7.14
(Continued)

FOREIGN PATENT DOCUMENTS

KR   10-1958623   3/2019

OTHER PUBLICATIONS

James Mure-Dubois and Heinz Hugli, "Real-time scattering compensation for time-of-flight camera", Jan. 2007, The 5th International Conference on Computer Vision Systems (ICVS 2007).
(Continued)

*Primary Examiner* — Peter D Le
(74) *Attorney, Agent, or Firm* — F. Chau & Associates, LLC

(57) ABSTRACT

An imaging device includes a light source operating in response to an optical control signal having a predetermined frequency, a sensor including a plurality of pixels, configured to generate an electrical signal in response to a light reception signal output by the light source and reflected from a subject, and a logic circuit configured to generate first raw data of a spatial domain based on the electrical signal, and an image signal processor configured to convert the first raw data into second raw data of a frequency domain, to select low-frequency data of the second raw data within a frequency band lower than a predetermined reference frequency, to apply a predetermined weighting to the low-frequency data to generate weighted data, and to generate a resultant image based on the first raw data and the weighted data.

19 Claims, 18 Drawing Sheets

(51) Int. Cl.
  *G06T 7/521* (2017.01)
  *G06T 5/20* (2006.01)
  *G06T 5/00* (2006.01)
  *G01S 17/08* (2006.01)
  *G01S 17/89* (2020.01)
  *G06T 5/10* (2006.01)

(52) U.S. Cl.
  CPC ............... *G06T 5/002* (2013.01); *G06T 5/10* (2013.01); *G06T 5/20* (2013.01); *G06T 7/521* (2017.01); *H04N 5/2256* (2013.01); *G06T 2207/10028* (2013.01)

(58) Field of Classification Search
  CPC .. G06T 5/002; G06T 5/10; G06T 5/20; G06T 7/521; H04N 5/2256; H04N 5/23229; H04N 5/3745; H04N 5/378
  See application file for complete search history.

(56) References Cited

U.S. PATENT DOCUMENTS

| | | | | |
|---|---|---|---|---|
| 5,282,030 | A * | 1/1994 | Nishimura | H04N 9/0451 375/240.18 |
| 5,852,648 | A * | 12/1998 | Miyamoto | G06T 5/40 378/62 |
| 6,016,365 | A * | 1/2000 | Shin | H04N 19/136 375/E7.211 |
| 6,125,143 | A * | 9/2000 | Suzuki | H04N 19/46 348/420.1 |
| 6,172,770 | B1 * | 1/2001 | Inoue | H04N 1/4051 358/463 |
| 6,240,121 | B1 * | 5/2001 | Senoh | H04N 1/32181 382/248 |
| 6,456,663 | B1 * | 9/2002 | Kim | H04N 19/60 375/240.24 |
| 6,816,193 | B1 * | 11/2004 | Kohashi | H04N 5/142 348/E5.064 |
| 7,092,965 | B2 * | 8/2006 | Easwar | H04N 19/63 |
| 7,102,697 | B2 * | 9/2006 | Lei | G06T 5/10 348/678 |
| 7,362,911 | B1 * | 4/2008 | Frank | H04N 5/365 382/209 |
| 7,397,035 | B2 | 7/2008 | Watson | |
| 7,791,715 | B1 * | 9/2010 | Bamji | G01C 3/08 356/5.1 |
| 8,121,427 | B2 * | 2/2012 | Tian | H04N 19/18 382/245 |
| 8,809,791 | B2 | 8/2014 | Olivier et al. | |
| 9,148,649 | B2 | 9/2015 | Raskar et al. | |
| 10,147,216 | B1 * | 12/2018 | Miao | H04N 7/185 |
| 2002/0037091 | A1 * | 3/2002 | Terasaki | H04N 1/32144 709/246 |
| 2002/0039448 | A1 * | 4/2002 | Ito | G06T 5/10 382/232 |
| 2002/0071612 | A1 * | 6/2002 | Pine | G02B 27/46 382/280 |
| 2007/0116125 | A1 * | 5/2007 | Wada | H04N 19/63 375/E7.193 |
| 2008/0013844 | A1 * | 1/2008 | Hu | H04N 19/63 375/E7.048 |
| 2008/0095450 | A1 * | 4/2008 | Kirenko | H04N 19/36 382/232 |
| 2009/0257664 | A1 * | 10/2009 | Kao | H04N 19/117 382/232 |
| 2010/0225782 | A1 * | 9/2010 | Sambongi | H04N 5/2356 348/E5.037 |
| 2012/0113287 | A1 * | 5/2012 | Johnson | H04N 5/217 348/222.1 |
| 2012/0176476 | A1 * | 7/2012 | Schmidt | G01S 17/894 348/46 |
| 2012/0269263 | A1 * | 10/2012 | Bordes | H04N 19/129 375/E7.125 |
| 2013/0114876 | A1 * | 5/2013 | Rudaz | H04N 1/32325 382/135 |
| 2013/0216117 | A1 * | 8/2013 | Mercuriev | G06T 5/002 382/132 |
| 2014/0028861 | A1 * | 1/2014 | Holz | H04N 5/357 348/208.4 |
| 2014/0247968 | A1 * | 9/2014 | Pavlic | G06V 20/56 382/104 |
| 2015/0302615 | A1 * | 10/2015 | Fukuda | A61B 6/502 378/19 |
| 2017/0098317 | A1 * | 4/2017 | Qi | G06T 11/008 |
| 2017/0176575 | A1 * | 6/2017 | Smits | G01S 17/48 |
| 2017/0322310 | A1 * | 11/2017 | Godbaz | G06T 5/002 |
| 2017/0360391 | A1 | 12/2017 | Kawamura | |
| 2018/0176562 | A1 * | 6/2018 | Iwamura | H04N 19/619 |
| 2018/0205963 | A1 * | 7/2018 | Matei | H04N 21/85406 |
| 2018/0313955 | A1 * | 11/2018 | Xu | G01S 17/32 |
| 2019/0130208 | A1 * | 5/2019 | Michael | G06K 9/6256 |
| 2019/0164050 | A1 * | 5/2019 | Chen | G06N 3/084 |
| 2019/0257928 | A1 | 8/2019 | Hollmann | |
| 2020/0244971 | A1 * | 7/2020 | Wang | H04N 19/523 |
| 2021/0088636 | A1 * | 3/2021 | Xu | G01S 7/4911 |

OTHER PUBLICATIONS

Tom Kavlia, et al. "Modelling and Compensating Measurement Errors Caused by Scattering in Time-Of-Flight Cameras", The International Society for Optical Engineering, Aug. 2008.

* cited by examiner

IMAGING DEVICE AND ELECTRONIC DEVICE INCLUDING THE SAME

CROSS-REFERENCE TO RELATED APPLICATION(S)

This U.S. non-provisional patent application claims benefit of priority under 35 U.S.C. 119(a) to Korean Patent Application No. 10-2020-0027643 filed on Mar. 5, 2020 in the Korean Intellectual Property Office, the disclosure of which is incorporated by reference in its entirety herein.

1. TECHNICAL FIELD

Example embodiments of the present disclosure relate to an imaging device and an electronic device including the same.

2. DISCUSSION OF RELATED ART

An imaging device converts an optical signal into an electrical signal to generate an image. The imaging device may be mounted in an electronic device to provide a camera function. A depth map is an image that contains distance information relating to the distance of the surfaces of objects from a viewpoint. The imaging device may generate the depth map using the optical signal. However, the depth map may include errors when the optical signal includes noise. Thus, the quality of image generated by an imaging device may decrease when the optical signal includes excessive noise.

SUMMARY

At least one example embodiment of the inventive concept provides an imaging device, which is less susceptible to the effects of optical noise, and an electronic device including the image device. The imaging device may improve noise characteristics and improve accuracy of a resultant image.

According to an example embodiment of the inventive concept, an imaging device includes a light source operating in response to an optical control signal having a predetermined frequency, a sensor including a plurality of pixels, configured to generate an electrical signal in response to a light reception signal output by the light source and reflected from a subject, and a logic circuit configured to generate first raw data of spatial domain based on the electrical signal, and an image signal processor configured to convert the first raw data into second raw data of a frequency domain, to select low-frequency data of the second raw data within a frequency band lower than a predetermined reference frequency, to apply a predetermined weighting to the low-frequency data to generate weighted data, and to generate a resultant image based on the first raw data and the weighted data.

According to an example embodiment of the inventive concept, an imaging device includes a light source operating in response to an optical control signal having a predetermined frequency, a sensor configured to generate raw data using a light reception signal output by the light source and reflected from a subject, the raw data including a first area having a depth smaller than a predetermined reference depth and a second area having a depth greater than the reference depth, and an image signal processor configured to convert the raw data of the second area into a frequency domain, to select low-frequency data within the frequency domain, and to apply a weighting to the low-frequency data to generate a resultant image.

According to an example embodiment of the inventive concept, an imaging device includes a pixel array including a plurality of pixels, each pixel operating in response to a first photo control signal and a second photo control signal having different phases to output a first electrical signal and a second electrical signal, a logic circuit configured to generate raw data for generating a depth image using the first electrical signal and the second electrical signal, and an image signal processor configured to convert the raw data from a spatial domain into a frequency domain and to reduce a size of low-frequency data of the of the frequency domain included in a low-frequency band lower than a predetermined reference frequency, to generate a resultant image.

According to an example embodiment of the inventive concept, an electronic device includes a sensor having a plurality of pixels for generating an electrical signal in response to an externally incident optical signal, and a logic circuit configured to generate raw data for generating a depth image based on the electrical signal, and a processor communicatively connected to the sensor by a predetermined interface. The processor converts the raw data into a frequency domain, selects low-frequency data within the frequency domain included in a low-frequency band lower than a predetermined reference frequency, and reduces a size of the low-frequency data to generate the depth image.

BRIEF DESCRIPTION OF DRAWINGS

The present disclosure will be more clearly understood from the following detailed description, taken in conjunction with the accompanying drawings.

DETAILED DESCRIPTION OF THE EXAMPLE EMBODIMENTS

Hereinafter, example embodiments of the inventive concept will be described with reference to the accompanying drawings.

Figure 1:
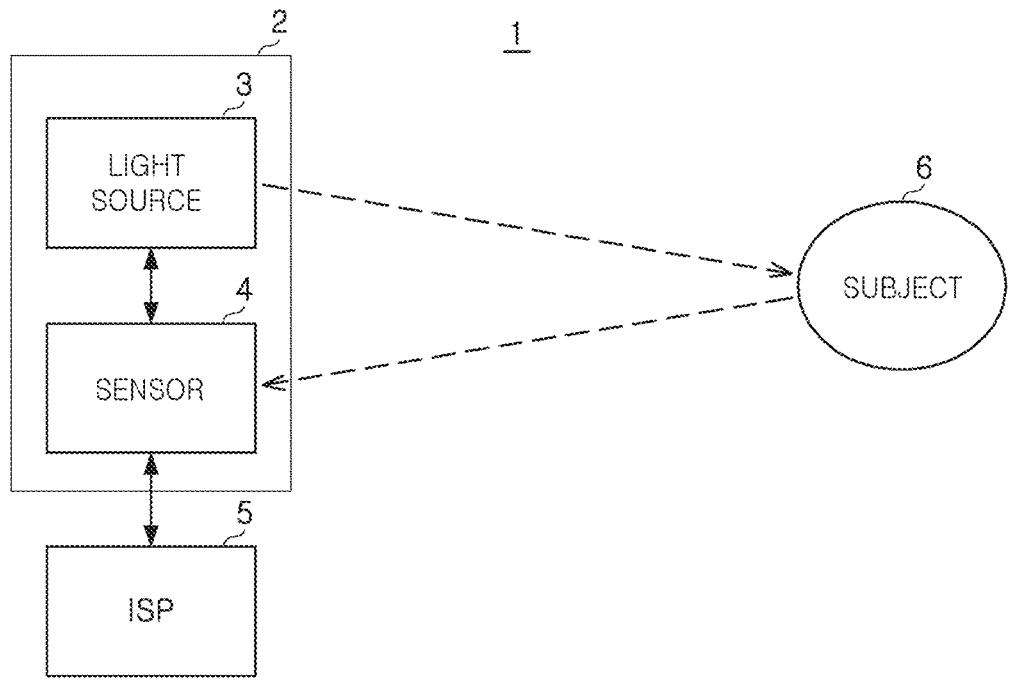
FIGS. 1 and 2 are schematic block diagrams of an imaging device according to an example embodiment of the inventive concept.
Figure 2:
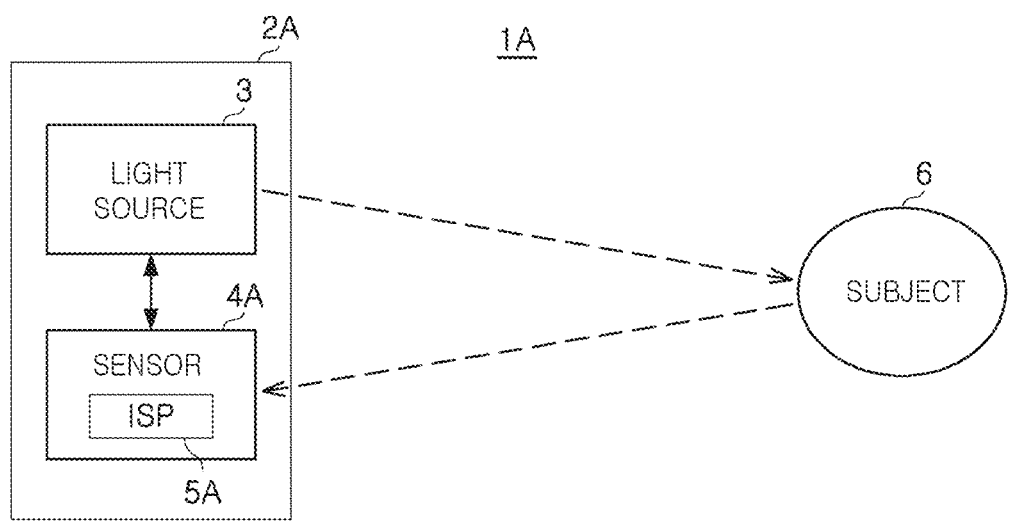

FIGS. 1 and 2 are schematic block diagrams of an imaging device according to an example embodiment of the inventive concept.

Referring first to FIG. 1, an imaging device 1 according to an example embodiment of the inventive concept includes a sensor module 2 and an image signal processor 5. The sensor module 2 includes a light source 3 and a sensor 4. In the embodiment illustrated in FIG. 1, the sensor module 2 and the image signal processor 5 may be included in different semiconductor devices. As an example, the sensor module 2 is implemented in the form of a semiconductor package including the light source 3 and the sensor 4, and the image signal processor 5 are included in a semiconductor device. The semiconductor device may be connected to communicate with the sensor module 2 through a predetermined interface, such as an application process, a central processing unit, a system-on-chip, or the like.

The light source 3 may include at least one light emitting element outputting an optical signal in a predetermined wavelength band. The light emitting element may be implemented as vertical cavity surface emitting laser (VCSEL) or a light emitting diode (LED). For example, when the light source 3 includes a plurality of light emitting elements, the light emitting elements may be arranged on a substrate in an array form. The light source 3 may further include an optical element, or the like, arranged on a propagation path of the optical signal to improve characteristics of the optical signal. For example, the optical element could include a lens. As an example, the optical signal output from the light source 3 may be an optical signal in an infrared wavelength band.

The light source 3 may operate with two or more optical control signals having different operating frequencies. For example, the light source 3 may operate with a first optical control signal, having a first frequency, during a first light emission time and operate with a second optical control signal, having a second frequency, different from the first frequency, during a second light emission time. Alternatively, the light source 3 may include a first light source, operating with a first optical control signal, and a second light source operating with a second optical control signal. In this case, the first light source and the second light source may operate by taking turns.

An optical signal, output from the light source 3, may be reflected by a subject 6, and the light reception signal reflected by the subject 6 may be incident into the sensor 4.

The sensor 4 may include pixels generating an electrical signal in response to the light reception signal and a logic circuit generating raw data (e.g., raw image data) required to generate a resultant image using the electrical signal. The raw data may include depth information indicating a distance between the subject 6 and a background around or behind the subject 6. The image signal processor 5 may generate a resultant image using the raw data, and the resultant image may be the depth image indicating the distance between the subject 6 and the background around or behind the subject 6.

Referring to FIG. 2, a sensor module 2A and an image signal processor 5A of an imaging device 1A are implemented in a single package according to an example embodiment of the inventive concept. Referring to FIG. 2, a light source 3, a sensor 4A, and an image signal processor 5A may be included in a single semiconductor package. The image signal processor 5A may be included in the sensor 4A as shown in FIG. 2, or may be implemented separately from the sensor 4A.

In the example embodiments illustrated in FIGS. 1 and 2, the image signal processors 5 and 5A may be implemented as software or hardware. As an example, when the image signal processor 5 is implemented separately from the sensor module 2 as in the example embodiment illustrated FIG. 1, the image signal processor 5 may be implemented as software inside of an application processor. For example, the functions performed by the image signal processor may be included as instructions in the software for execution by the application processor. In addition, when the image signal processor 5A is integrated into the sensor module 2A, the image signal processor 5A may be implemented as hardware, as in the example embodiment illustrated in FIG. 2.

Figure 3:
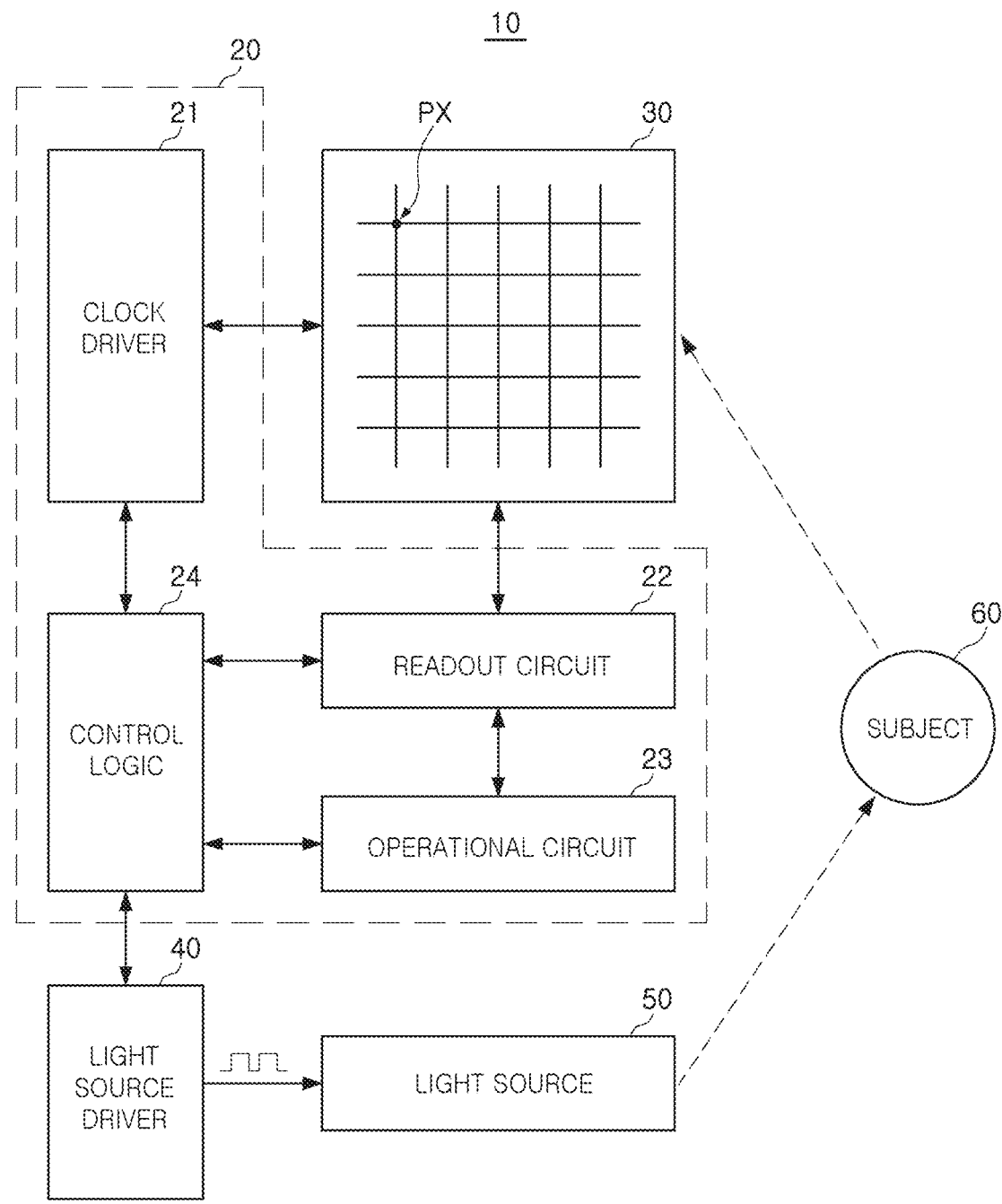
FIG. 3 is a schematic block diagram of an imaging device according to an example embodiment of the inventive concept.

FIG. 3 is a schematic block diagram of an imaging device according to an example embodiment of the inventive concept.

Referring to FIG. 3, an imaging device 10 includes a logic circuit 20, a pixel array 30, a light source driver 40 (e.g., a driver circuit), and a light source 50. The pixel array 30 may include a plurality of pixels PXs arranged along a plurality of rows and a plurality of columns in an array form. Each of the plurality of pixels PX may include a photodiode, generating a charge in response to a light reception signal incident from the subject 60, and a pixel circuit generating an electric signal corresponding to the charge generated by the photodiode.

As an example, the pixel circuit may include a floating diffusion region, a transfer transistor, a reset transistor, a driving transistor, and a select transistor. The configuration of the pixels PX may vary according to example embodiments. As an example, unlike a silicon photodiode, each of the pixels PX may include an organic photodiode including an organic material or may be implemented as a digital pixel. When the pixels PX are implemented as digital pixels, each of the pixels PX may include a comparator, and a counter converting an output of the comparator into a digital signal and outputting the digital signal.

The logic circuit 20 may include a plurality of circuits for controlling the pixel array 30. As an example, the logic circuit 20 includes a clock driver 21 (e.g., a driver circuit), a readout circuit 22, an arithmetic circuit 23, and control logic 24 (e.g., a logic circuit). The clock driver 21 may drive the pixel array 30 in a first direction or a second direction. For example, the clock driver 21 may generate a transfer control signal input to a transfer gate of the pixel array 30, a reset control signal input to a reset gate of the pixel circuit 20, a select control signal input to a selection gate of the pixel circuit 20, or a photo control signal input to a photo gate of the pixel array 30. The first direction and the second direction may be defined in various manners. As an example, the first direction may correspond to a row direction and the second direction may correspond to a column direction.

The readout circuit 22 may include at least one of a correlated double sampler (CDS) and an analog-to-digital converter (ADC). The correlated double sampler may be connected to pixels PX, selected by a clock signal provided by the clock driver 21, through column lines and may perform correlated double sampling to detect a reset voltage and a pixel voltage. The analog-to-digital converter may convert the reset voltage and the pixel voltage, detected by the correlated double sampler, into digital signals and may transmit the digital signals to the operational circuit 23.

The operational circuit 23 may include a latch or a buffer circuit, which may temporarily store a digital signal, and an amplifier circuit to amplify the digital signal. The operational circuit 23 may process the digital signal received from the readout circuit 22. The clock driver 21, the readout circuit 22, and the arithmetic circuit 23 may be controlled by the control logic 24. The control logic 24 may include a timing controller for controlling operation timings of the readout circuit 22 and the calculation circuit 23, and an image signal processor for processing image data. In an example embodiment of the inventive concept, the operational circuit 23 is included in the control logic 24.

The control logic 24 may perform signal processing on data, output by the readout circuit 22 and the operational circuit 23, to generate raw data for generating a resultant image. As an example, a resultant image generated by the raw data may be a depth image. When an image signal processor is included in the control logic 24, the control logic 24 may generate a resultant image using the raw data.

According to an example embodiment of the inventive concept, the control logic 24 calculates a distance between the subject 60 and the imaging device 10 or determines whether the subject 60 is close to the imaging device 10, based on an operating mode of the imaging device 10, using data output by the readout circuit 22 and the operational circuit 23. Alternatively, the operational circuit 23 may generate a depth image, and the control logic 24 may post-process the depth image to improve the quality of the resultant image.

The imaging device 10 may include a light source 50 for outputting an optical signal to the subject 60. The light source 50 may include at least one light emitting element. As an example, the light source 50 may include a semiconductor chip in which a plurality of light emitting elements are arranged in an array form. The light source 50 may operate under control of the light source driver 40. The light source driver 40 may be controlled by the logic circuit 20.

In an example embodiment of the inventive concept, the light source driver 40 generates an optical control signal, having pulse signal characteristics, to drive the light source 50. The light source driver 40 may generate an optical control signal as a pulse width modulation (PWM) signal in response to a control command of the logic circuit 20. The light source driver 40 may determine a frequency, a duty ratio, and duration of the optical control signal using the control command. As an example, the logic circuit 20 may synchronize at least one of a plurality of clock signals input by the clock driver 21 to the pixel array 30 with the optical control signal input to the light source 50. In an example embodiment of the inventive concept, the signal synchronized with the optical control signal input to the light source 50 may be a photo control signal input to the pixels PX by the clock driver 21. The photo control signal may be a signal that controls on/off switching of a transistor connected between a photodiode and a floating diffusion region of each of the pixels PX.

According to an example embodiment of the inventive concept, optical elements, such as a lens and a filter, may be disposed on a propagation path through which the light reception signal reflected by the subject 60 is incident into the pixel array 30. For example, a microlens may be formed on a light incident surface of the pixel array 30 on which the light reception signal is incident. When a portion of the light reception signal is reflected from the light incident surface of the pixel array 30, the reflected light reception signal may be scattered between the optical elements and the pixel array 30 and may re-enter the pixels PX as a light noise signal. Accordingly, an effect of the optical noise signal, in addition to the light reception signal, may be reflected in the pixels PX to result in an error in depth information included in the resultant image.

In an example embodiment of the inventive concept, a method of reducing an error of a resultant image caused by an optical noise signal is proposed. In an example embodiment of the inventive concept, raw data for generating a resultant image is converted into a frequency domain, data in the frequency domain having a predetermined frequency band is selected and a weighting is applied to the selected data to reduce an effect caused by the optical noise signal. As an example, since an optical noise signal generated by scattering has an effect on a wide area of the pixel array 30, data of the frequency band having a low frequency band (e.g., less than a predetermined frequency) is selected and a weighting is applied to the selected data to reduce an error of the resultant image.

Figure 4A:
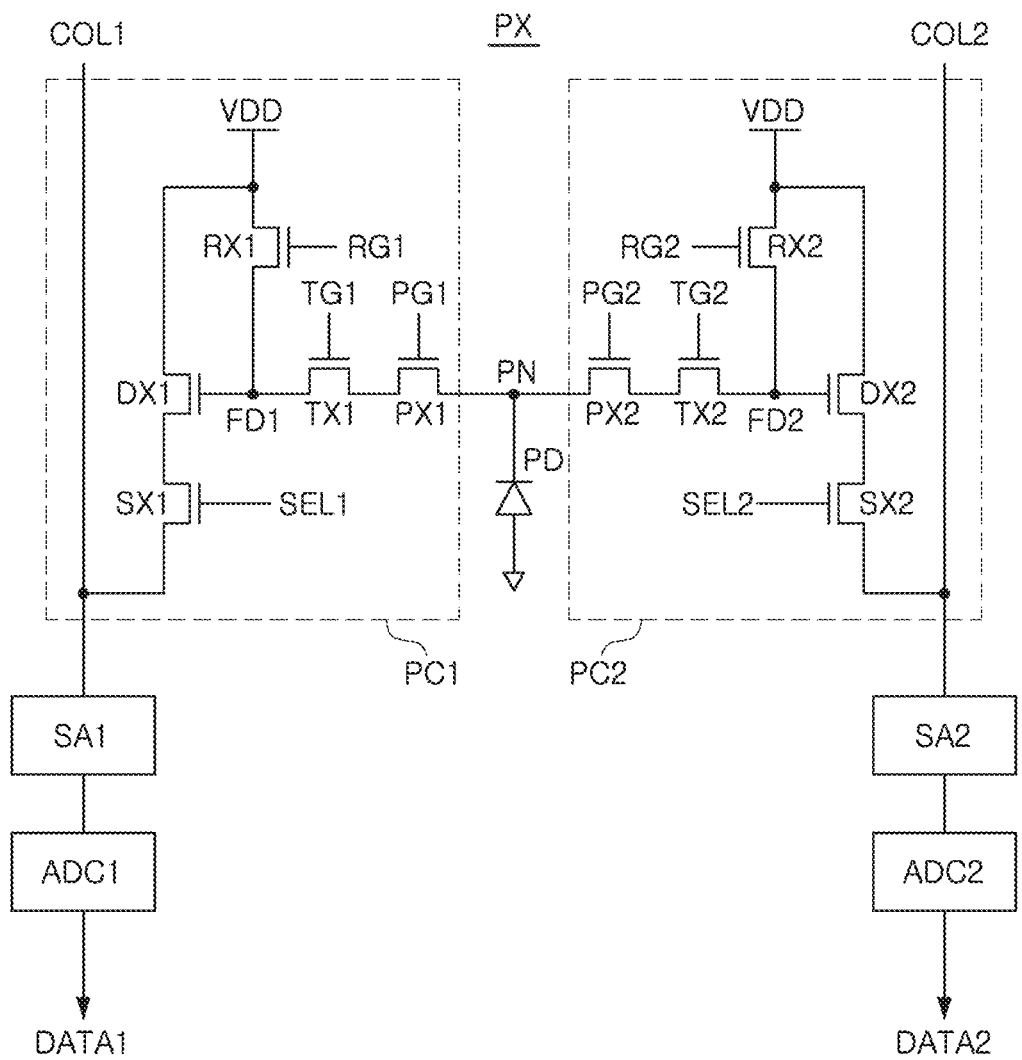
FIGS. 4A to 4C illustrate an operation of an imaging device according to an example embodiment of the inventive concept.
Figure 4B:
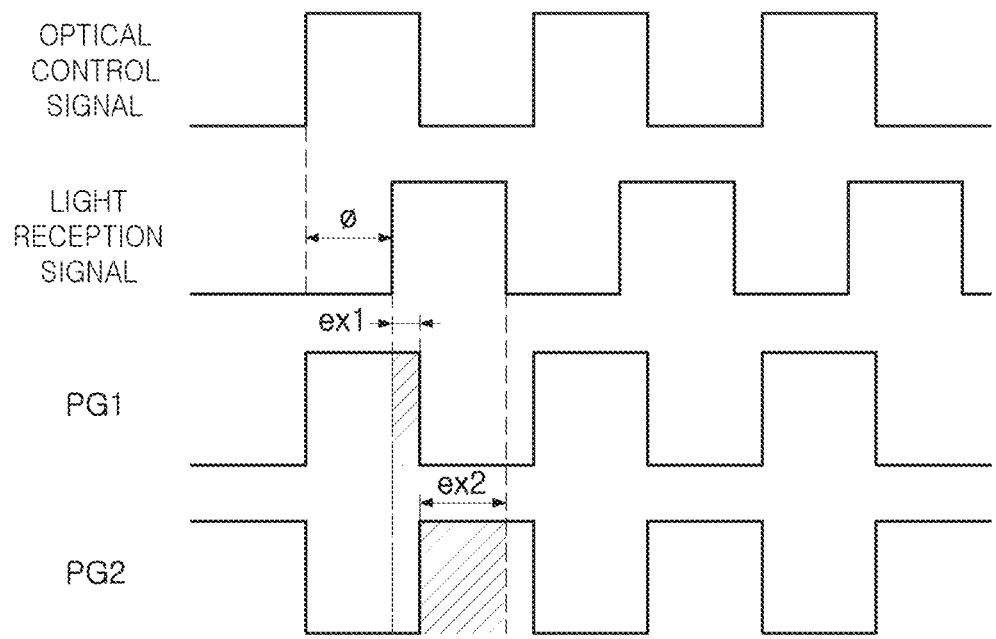
Figure 4C:
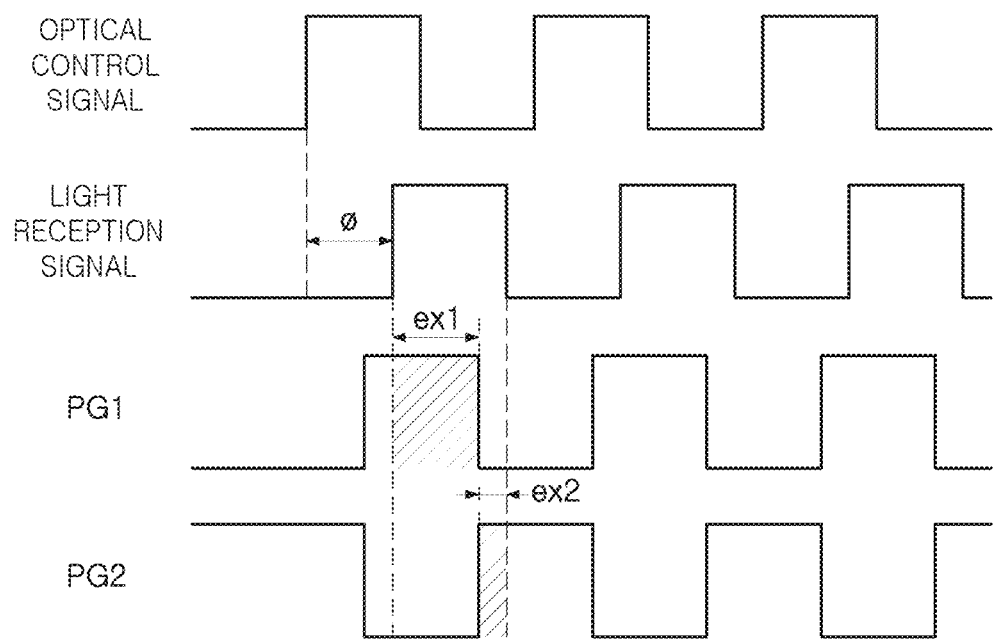

FIGS. 4A to 4C illustrate an operation of an imaging device according to an example embodiment of the inventive concept.

Referring first to FIG. 4A, a pixel PX of an imaging device (e.g., 10) according to an example embodiment of the inventive concept includes a photodiode PD, generating a charge in response to an optical signal, and a pixel circuit outputting an electrical signal corresponding to the charge generated by the photodiode PD. The pixel circuit may include a first pixel circuit PC1 and a second pixel circuit PC2. The first pixel circuit PC1 may be connected to a first sampling circuit SA1 and a first analog-to-digital converter ADC1 through the first column line COL1, and the second pixel circuit PC2 may be connected to a second sampling circuit SA2 and a second analog-to-digital converter ADC2 through a second column line COL2.

The first pixel circuit PC1 may include a first photo transistor PX1 connected to the photodiode PD, a first transfer transistor TX1, a first floating diffusion region FD1 in which charges generated by the photodiode PD are accumulated, and a plurality of first circuit elements RX1, DX1, and SX1. The plurality of first circuit elements RX1, DX1, and SX1 may include a first reset transistor RX1, a first driving transistor DX1, and a first select transistor SX1. The second pixel circuit PC2 may have a structure similar to a structure of the first pixel circuit PC1. Control signals TG1, RG1, and SEL1 for controlling the first transfer transistor TX1, the first reset transistor RX1, and the first select transistor SX1 may be input by a clock driver (e.g., 21) of the imaging device. For example, the second pixel circuit PC2 may include a second photo transistor PX2 connected to the photodiode PD, a second transfer transistor TX2, a second floating diffusion region FD2 in which charges generated by the photodiode PD are accumulated, and a plurality of second circuit elements RX2, DX2, and SX2. Control signals TG2, RG2, and SEL2 for controlling the second transfer transistor TX2, the second reset transistor RX2, and the second select transistor SX2 may be input by a clock driver (e.g., 21) of the imaging device.

When the first reset transistor RX1 is turned on, a voltage of the first floating diffusion region FD1 may be reset to a power supply voltage VDD and the select transistor SX1 may be turned on to enable the first sampling circuit SA1 to detect a first pixel voltage. During a first exposure time before the first reset transistor RX1 is turned off and the first transfer transistor TX1 is turned on, the photodiode PD is exposed to light to generate charges.

When the first transfer transistor TX1 is turned on, charges generated by the photodiode PD and accumulated in the first phototransistor PX1 may move to the first floating diffusion region FD1. The first sampling circuit SA1 may detect a first pixel voltage in response to the turning on of the first select transistor SX1. The first analog-to-digital converter ADC1 may convert a difference between the first reset voltage and the first pixel voltage into first raw data DATA1 having a digital format.

An operation of the second pixel circuit PC2 may be similar to an operation of the first pixel circuit PC1. For example, the second sampling circuit SA2 may detect a second pixel voltage in response to the turning on of the second selection transistor SX1, and the second analog-to-digital converter ADC2 may convert a difference between the second reset voltage and the second pixel voltage into second raw data DATA2 having a digital format. However, the second photo transistor PX2 may be turned on at a point in time different from a point in time of the first photo transistor PX1. Therefore, a second pixel voltage, output by the second pixel circuit PC2 through the second column line COL2, may correspond to a charge resulting from exposing the photodiode PD to light during a second exposure time different from the first exposure time. The second analog-to-digital converter ADC2 may convert a difference between the second reset voltage and the second pixel voltage into second raw data DATA2.

FIGS. 4B and 4C diagrams illustrating an operation of the pixel PX depending on the first photo control signal PG1 and the second photo control signal PG2. As an example, FIG. 4B illustrates a first photo control signal PG1 and a second photo control signal PG2 input to the pixel PX during a first time, and FIG. 4C illustrates a first photo control signal PG1 and a second photo control signal PG2 input to a pixel PX during a second time. In an example embodiment of the inventive concept, each of the first and second times may be a frame period of an image sensor.

Referring to FIG. 4B, during the first time, the first photo control signal PG1 has a same phase as the optical control signal and the second photo control signal PG2 has a phase difference of 180 degrees from the optical control signal. Referring to FIG. 4C, during the second time, the first photo control signal PG1 has a phase difference of 90 degrees from the optical control signal and the second transmission control signal TG2 has a phase difference of 270 degrees from the optical control signal.

The imaging device may generate a resultant image, including depth information of a subject, using first raw data DATA1 and second raw data DATA2 obtained during the first time, and first raw data DATA1 and second raw data DATA2 obtained during the second time. The first raw data DATA1, obtained by the imaging device at each of the first and second times, may be determined by a first exposure time ex1 in which the first photo control signal PG1 and the light reception signal overlap each other. Similarly, the second raw data DATA2 may be determined by a second exposure time ex2 in which the second photo control signal PG2 and the light reception signal overlap each other.

For example, when the first raw data DATA1 and the second raw data DATA2 obtained by the imaging device during the first time are respectively defined as A0 and A1 and the first raw data DATA1 and the second raw data DATA2 obtained by the imaging device during the second time period are respectively defined as A2 and A3, a phase difference φ between the optical control signal and the optical reception signal may be calculated based on Equation 1.

$$\varphi = \arctan\frac{A1 - A3}{A0 - A2} \quad \text{Equation 1}$$

In addition, information of depth to a pixel PX and a subject, generating a light reception signal, may be calculated based on Equation 2.

$$d = \frac{c}{2f_m}\frac{\varphi}{2\pi} \quad \text{Equation 2}$$

In Equation 2, $f_m$ denotes a frequency of the optical control signal and c denotes a velocity of light.

Figure 5A:
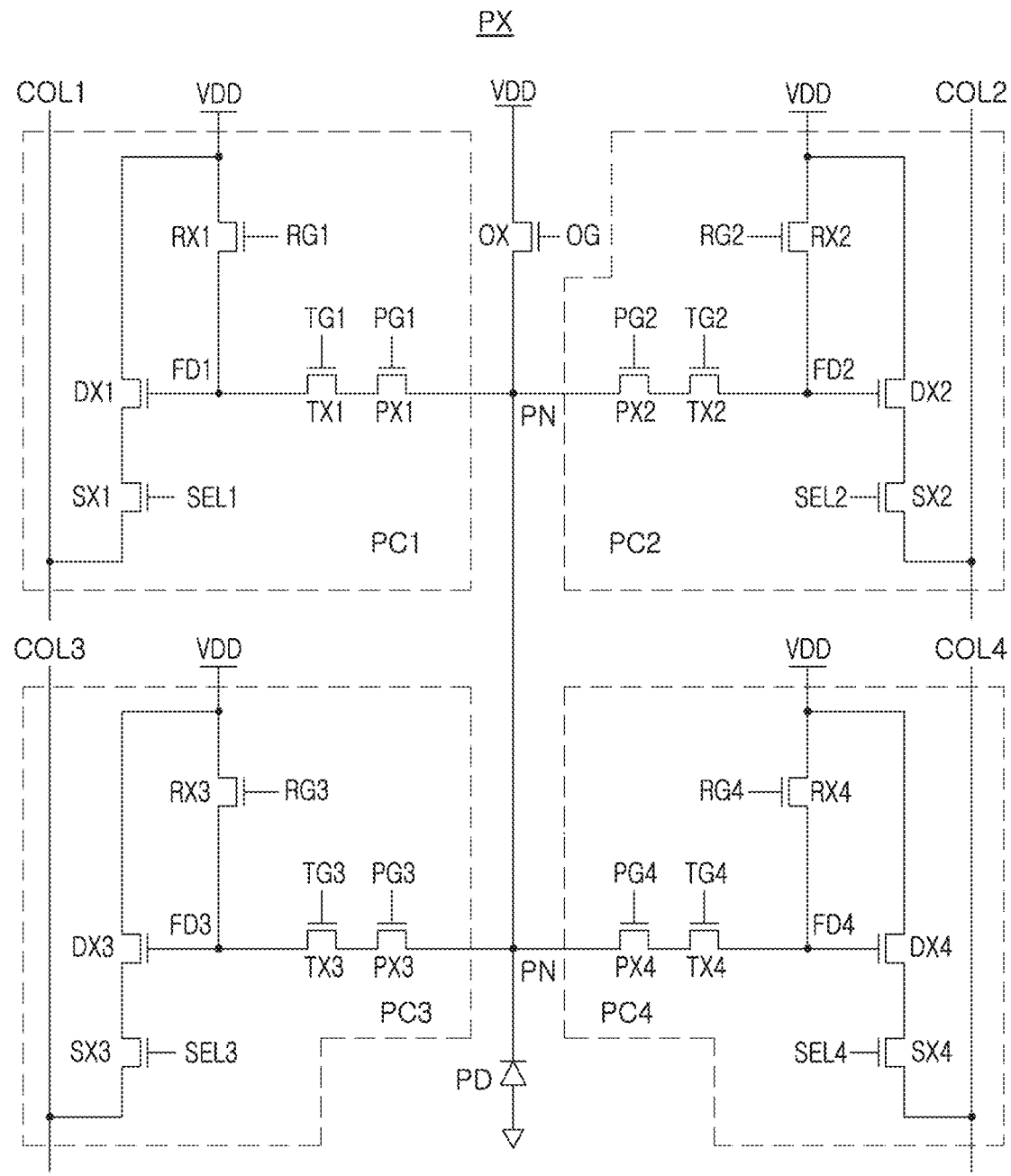
FIGS. 5A and 5B illustrate an operation of an imaging device according to an example embodiment of the inventive concept.
Figure 5B:
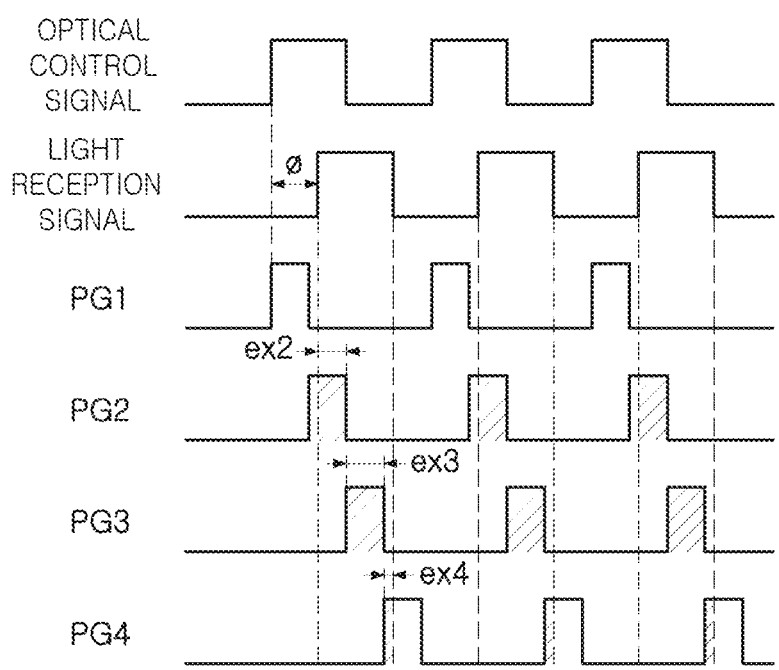

FIGS. 5A and 5B illustrate an operation of an imaging device according to an example embodiment of the inventive concept.

Referring to FIG. 5A, in a pixel PX of an image sensor according to an example embodiment, a plurality of pixel circuits PC1, PC2, PC3, and PC4 are connected to a single photodiode PD. In the example embodiment illustrated in FIG. 5A, first to fourth pixel circuits PC1, PC2, PC3, and PC4 are connected to the photodiode PD, and the first to fourth pixel circuits PC1, PC2, PC3, and PC4 may have substantially the same structure. The third pixel circuit PC3 may include a third photo transistor PX3 connected to the photodiode PD, a third transfer transistor TX3, a third floating diffusion region FD3 in which charges generated by the photodiode PD are accumulated, and a plurality of third circuit elements RX3, DX3, and SX3. Control signals TG3, RG3, and SEL3 for controlling the third transfer transistor TX3, the third reset transistor RX3, and the third select transistor SX3 may be input by a clock driver (e.g., 21) of the imaging device. The fourth pixel circuit PC4 may include a fourth photo transistor PX4 connected to the photodiode PD, a fourth transfer transistor TX4, a fourth floating diffusion region FD4 in which charges generated by the photodiode PD are accumulated, and a plurality of fourth circuit elements RX4, DX4, and SX4. Control signals TG4, RG4, and SEL4 for controlling the fourth transfer transistor TX4, the fourth reset transistor RX4, and the fourth select transistor SX4 may be input by a clock driver (e.g., 21) of the imaging device.

Operations of the first to fourth pixel circuits PC1, PC2, PC3, and PC4 may be similar to the operations described with reference to FIGS. 4A to 4C. In an example embodiment, the first to fourth phototransistors PX1, PX2, PX3, and PX4, included in the first to fourth pixel circuits PC1, PC2, PC3, and PC4, operate at different phases from each other while the photodiode PD is exposed to light.

Referring to FIG. 5B, a first photo control signal PG1 input to the first photo transistor PX1 and a second photo control signal PG2 input to the second photo transistor PX2 have a phase difference of 180 degrees from each other. A third photo control signal PG3 input to the third photo transistor PX3 and a fourth photo control signal PG4 input to the fourth photo transistor PX4 also have a phase difference of 180 degrees from each other, and the third photo control signal PG3 has a phase difference of 90 degrees from the first photo control signal PG1. In an example embodiment, the first to fourth photo control signals PG1, PG2, PG3, and PG4 have the same period as the optical control signal and may have a duty ratio similar to a duty ratio of the optical control signal. For example, the duty ratio of the first to fourth photo control signals PG1, PG2, PG3, and PG4 may be half of the duty ratio of the optical control signal.

The image sensor may generate a depth map using pixel voltages obtained from charges stored in the first to fourth photo transistors PX1, PX2, PX3, and PX4 by the above-described phase difference operations. In a readout operation, first raw data corresponding to a charge stored in the first photo transistor PX1 is output through a first column line COL1, and second raw data corresponding to a charge stored in the second photo transistor PX2 is output through a second column line COL2. Also, third raw data corresponding to a charge of the third photo transistor PX3 is output through the third column line COL3, and fourth raw data corresponding to a charge of the fourth storage transistor PX4 is output through a fourth column line COL4. A method of calculating depth information using the first raw data to the fourth raw data may be the same as described with reference to Equations 1 and 2.

According to an example embodiment of the inventive concept, the first pixel circuit PC1 and the third pixel circuit PC3 are connected to a single column line, and the second pixel circuit PC2 and the fourth pixel circuit PC4 are connected to a single column line. For example, the column lines COL1 and COL3 could be connected together to form one of the single column lines and column lines COL2 and COL4 could be connected together to form another one of the single column lines. Similarly to what is described above, pixels PX disposed in the same location in a row direction and adjacent in the column direction may share the first to fourth photo control signals PG1, PG2, PG3, and PG4 with each other.

Figure 6:
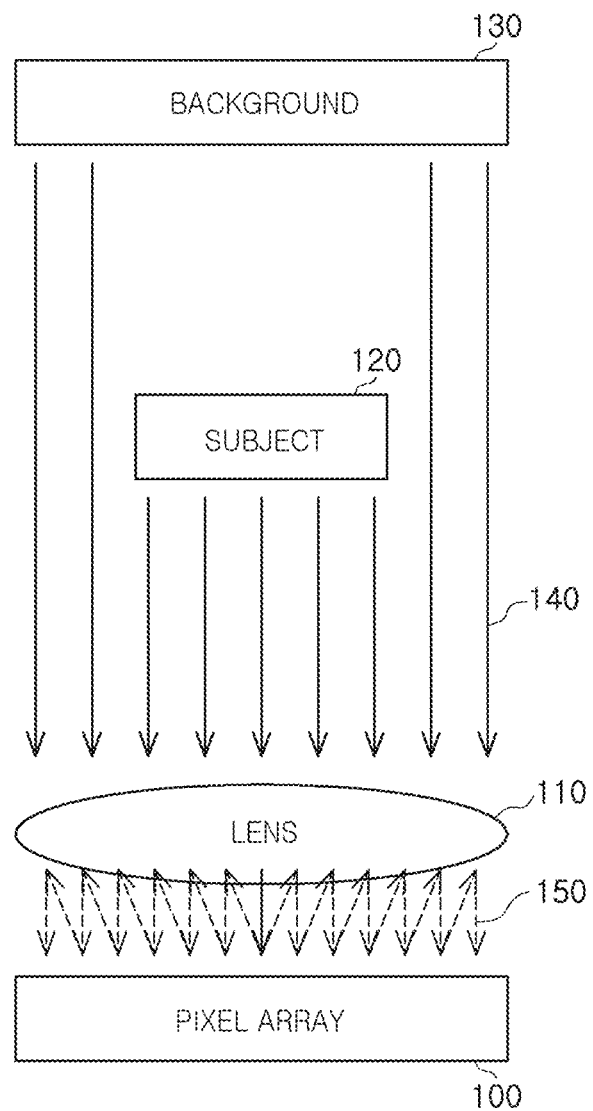
FIGS. 6 and 7 illustrate an operation of an imaging device according to an example embodiment of the inventive concept.
Figure 7:
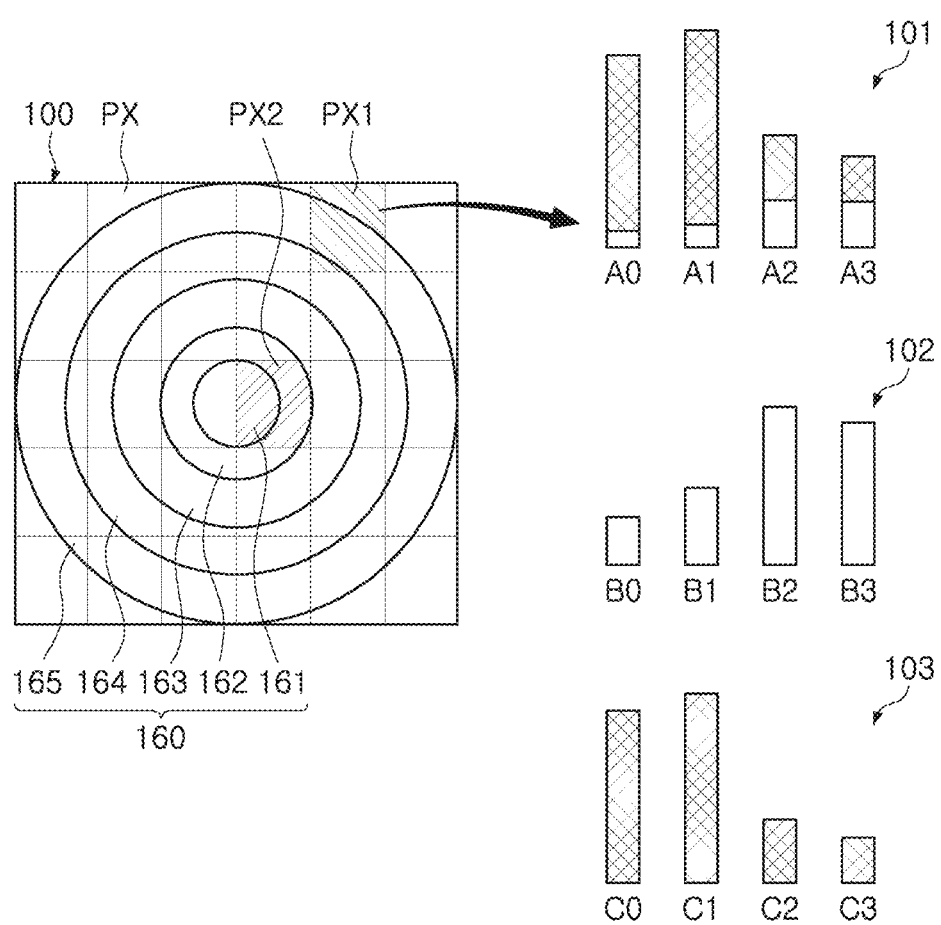

FIGS. 6 and 7 illustrate an operation of an imaging device according to an example embodiment of the inventive concept.

Referring to FIG. 6, an imaging device according to an example embodiment includes a pixel array 100, and a lens 110 disposed in a propagation path of a light reception signal 140 incident into the pixel array 100. In the example embodiment illustrated in FIG. 6, an object included in a resultant image may be a subject 120 and a background 130 around or behind the subject 120. As an example, a distance from the imaging device to the subject 120 and a distance from the imaging device to the background 130 may be different from each other. In addition, various types of depth information may be generated for each of the subject 120 and the background 130 according to shapes of the subject 120 and the background 130.

The light reception signal 140, incident into the pixel array 100 through the lens 110, may be an optical signal output from a light source included in the imaging device and reflected from the subject 120 or the background 130. The light reception signal 140 reflected from the subject 120 and the light reception signal 140 reflected from the background 130 may have different phases depending on a distance between the subject 120 and the imaging device and a distance between the background 130 and the imaging device.

In an example embodiment, the light reception signal 140, incident through the lens 110, may be reflected and/or scattered between the pixel array 100 and the lens 110 to generate an optical noise signal 150. The optical noise signal 150 may be modulated in a phase different from a phase of the light reception signal 140 while being reflected and/or scattered, and may be introduced into the pixel array 100. Accordingly, an effect of the optical noise signal 150, in addition to the light reception signal, may be reflected in the raw data output from at least a portion of the pixels included in the pixel array 100.

As described above, the imaging device may generate raw data from the electrical signals, respectively output by pixels in response to photo control signals having different phases, and may generate a resultant image from the raw data. When the optical noise signal 150 is present, sizes of a plurality of pieces of raw data output by the pixels by the light reception signal 140 may be changed. Accordingly, in the resultant image generated using the plurality of pieces of raw data, depth information of the subject 120 and/or the background 130 may be different from actual depth data. This will now be described in further detail with reference to FIG. 7.

Referring to FIG. 7, the pixel array 100 includes a plurality of pixels PX. Among the plurality of pixels PX, a first pixel PX1 and a second pixel PX2 are pixels disposed in different locations. In an example embodiment, an optical noise signal generated by reflection and/or scattering of a light reception signal incident into the second pixel PX2 may be incident into the first pixel PX1.

The optical noise signal may be diffused from a first point of the second pixel PX2 in which reflection and/or scattering occurs, to the pixels PX while having a specific shape. As an example, the optical noise signal may be diffused to the pixels PX while having a Gaussian signal shape. Accordingly, as illustrated in FIG. 7, a plurality of optical noise regions 160 (161 to 165) may be defined based on the second pixel PX2. Effects of optical noise signals on the pixels PX, included in each of the optical noise regions 161 to 165, may be substantially the same.

Referring to FIG. 7, the imaging device may obtain raw data 101 from the first pixel PX1. The raw data 101 of the first pixel PX1 may include first raw data A0 to fourth raw data A3. The first raw data A0 to the fourth raw data A3 may be a plurality of pieces of data generated by optical control signals of a light source included in the imaging device and photo control signals having phase differences of 0, 90, 180, and 270 degrees, respectively.

As an example, the raw data 101 obtained by the imaging device from the first pixel PX1 may include signal data 102, corresponding to light reception signal incident into the first pixel PX1, and noise data 103 corresponding to an optical noise signal generated by reflection and/or scattering in the second pixel PX2 to be incident into the first pixel PX1. The signal data 102 may include first signal data B0 to fourth signal data B3 and the noise data 103 may include first noise data C0 to fourth noise data C3 generated by photo control signals having phase differences of 0, 90, 180, and 270 degrees.

In the embodiment illustrated in FIG. 7, each of the first raw data A0 to the fourth raw data A3 is described as including signal data 102 and noise data 103. However, this is only an example and is not necessarily limited thereto. For example, only the signal data 102 or the noise data 103 may be present in at least one of the first raw data A0 to the fourth raw data A3.

Referring to FIG. 7, magnitudes of the first signal data B0 to the fourth signal data B3 may have a distribution different from a distribution of magnitudes of the first noise data C0 to the fourth noise data C3. As a result, the first noise data C0 to the fourth noise data C3 may cause an error in a depth value calculated from the first raw data A0 to the fourth raw data A3 obtained from the first pixel PX1 by the imaging device.

A ratio of a magnitude of the signal data 102 to a magnitude of the noise data 103 in the first raw data A0 to the fourth raw data A3 may vary depending on a location of the first pixel PX1. As an example, when the first pixel PX1 is included in a first area of the pixel array 100 receiving the light reception signal reflected from the subject 120, the first signal data B0 to the fourth signal data B3 may tend to have greater magnitudes than the first noise data C0 to the fourth noise data C3. As an example, when the first pixel PX1 is included in the first area, the sum of the magnitudes of the first signal data B0 to the fourth signal data B3 may be greater than the sum of the magnitudes of the first noise data C0 to the fourth noise data C3.

On the other hand, when the first pixel PX1 is included in a second area of the pixel array 100 receiving the light reception signal reflected from the background 130, the first signal data B0 to the fourth signal data B3 may tend to have smaller magnitudes than the first noise data C0 to the fourth noise data C3. For example, when the first pixel PX1 is included in the second area, the sum of the magnitudes of the first signal data B0 to the fourth signal data B3 may be smaller than the sum of the magnitudes of the first noise data C0 to the fourth noise data C3.

The example embodiment illustrated in FIG. 7 may correspond to a case in which the first pixel PX1 receives the light reception signal reflected from the background 130. Accordingly, in most of the first raw data A0 to the fourth raw data A3 obtained from the first pixel PX1 by the imaging device, the first noise data C0 to the fourth noise data C3 may be greater than the first signal data B0 to the fourth signal data B3.

In an example embodiment of the inventive concept, the raw data 101 is converted into a frequency domain and a weighting is applied to low-frequency data of the frequency domain in a low-frequency band, having a frequency lower than a predetermined reference frequency, to reduce an effect of the noise data 103. For example, the data of the frequency domain outside the low-frequency band could be multiplied by 1 and the low-frequency data could be multiplied by a number lower than 1. The optical noise signal, generated by reflection and/or scattering of the light reception signal may uniformly have an effect on the entire pixel array 100, which may be reflected in the raw data 101 and the resultant image as a low-frequency element. Accordingly, the raw data 101 may be converted into a frequency band and only low-frequency data may be extracted to adjust a size thereof, allowing an effect of the optical noise signal to be reduced and allowing the quality of a resultant image to be improved.

Figure 8:
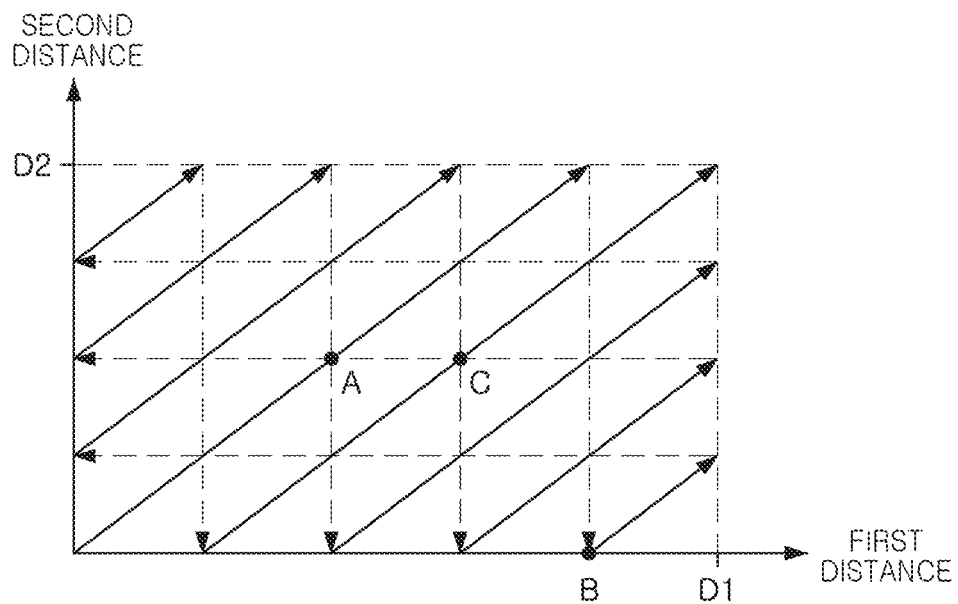
FIG. 8 illustrates a method of generating depth information in an imaging device according to an example embodiment of the inventive concept.

FIG. 8 illustrates a method of generating depth information in an imaging device according to an example embodiment of the inventive concept.

Referring to FIG. 8, a first distance and a second distance are shown. The first distance is depth information that the imaging device obtains when a light source operates with a first optical control signal having a first frequency, and the second distance is depth information that the imaging device obtains when the light source operates with an optical control signal having a second frequency. For example, the first frequency may be lower than the second frequency.

A maximum depth which may be measured during a single period of the first optical control signal may be a first depth D1, and a maximum depth which may be measured during a single period of the second optical control signal may be a second depth D2. A maximum depth, which may be measured by a predetermined optical control signal, may be in inverse proportion to the frequency of the optical control signal. A graph shown in FIG. 8 may correspond to an example embodiment in which the first frequency of the first optical control signal is 0.8 times the second frequency of the second optical control signal. Therefore, the second distance D2 may be 0.8 times the first distance D1.

In the graph shown in FIG. 8, a point A may correspond to a subject spaced apart from the imaging device by a third depth. As an example, the third depth may be 0.5 meter. In an example embodiment, roundtrip time-of-flight required for an optical signal, output from a light source, to be reflected to return from the point A may be ½ times T1, a period of the first optical control signal.

On the other hand, a roundtrip time-of-flight required for the optical signal, output from the light source, to be reflected to return from a point B may be T1, the period of the first optical control signal. In addition, a roundtrip time-of-flight in the point B may be 0.8 times T2, a period of the second optical control signal. For example, when a depth of the point B is defined as a fourth depth, the fourth depth may be the same as a second depth D2, the maximum depth which may be measured during a single period of the first optical control signal by operating the light source with the first optical control signal.

A roundtrip time-of-flight required for an optical signal, output from the light source, to be reflected to return from a point C may be 4.5 times the period T1, the period of the second optical control signal, and may be 3.6 times T2, the period of the second optical control signal. As described above, the light source may be driven with the first and second optical control signals, having different frequencies from each other, to measure various depths.

A roundtrip time-of-flight required for the optical signal to be reflected to return from each of the points A, B, and C may be calculated from a phase difference between the optical control signal and the light reception signal. When an optical noise signal generated by reflection and/or scattering in an imaging device is introduced into pixels, an error may occur due to the phase difference between the optical control signal and the light reception signal generated by the optical noise signal. In this case, an error may occur at a depth of each of the points A, B, and C.

As an example, when the phase difference between the light reception signal and the optical control signal reflected to return from the point A is increased by the optical noise signal, the depth of point A may be measured to be greater than an actual depth. Meanwhile, when the phase difference between the light reception signal and the optical control signal reflected to return from the point A is decreased by the optical noise signal, the depth of the point A may be measured to be smaller than the actual depth. Therefore, in at least one example embodiment of the inventive concept, an effect of the optical noise signal may be eliminated or significantly reduced to improve accuracy of depth information obtained by the imaging device.

Figure 9:
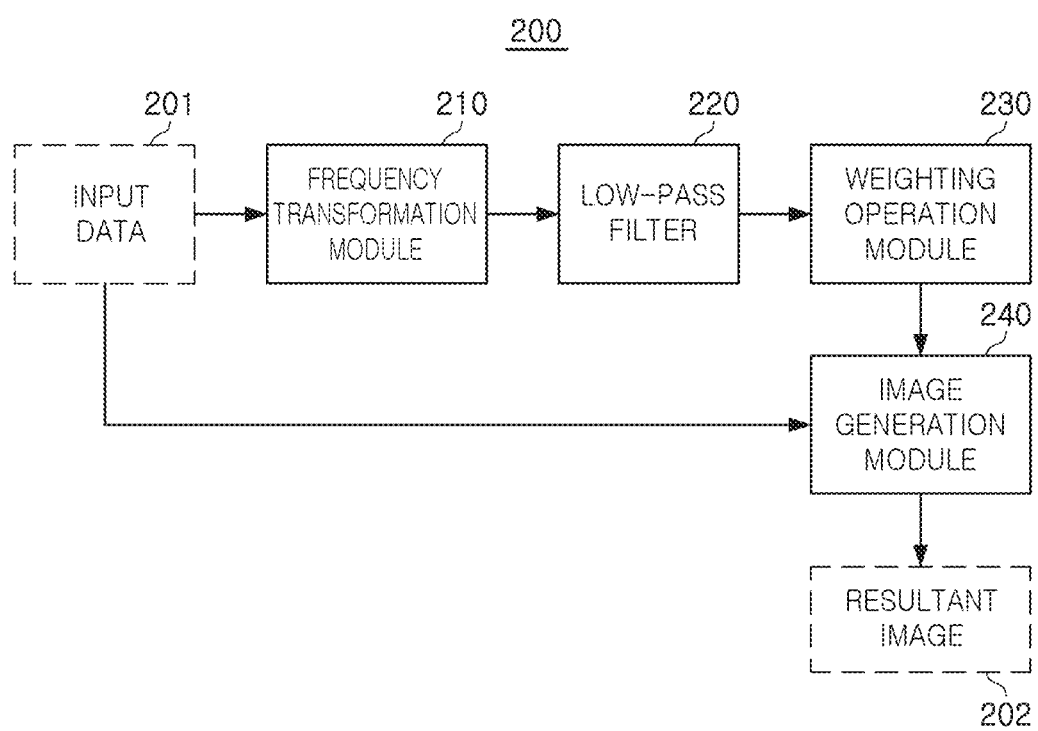
FIG. 9 is a schematic block diagram of an imaging device according to an example embodiment of the inventive concept.

FIG. 9 is a schematic block diagram of an imaging device according to an example embodiment of the inventive concept.

Referring to FIG. 9, an imaging device 200 according to an example embodiment of the inventive concept includes a frequency conversion (transformation) module 210, a low-pass filter 220, a weighting operational module 230, and an image generation module 240. In example embodiments, the frequency conversion module 210, the low-pass filter 220, the weighting operational module 230, and the image generation module 240 may be implemented in software or hardware, and may be mounted in an image signal processor of the imaging device 200.

The frequency conversion module 210 may receive input data 201 and convert the received input data into a frequency domain. The input data 201 may be raw data generated by a sensor of the imaging device 200. As an example, the imaging device 200 includes a light source (e.g., 3 or 50) and a sensor (e.g., 4 or 4A) operating in synchronization with the light source, and the sensor may include a pixel array (e.g., 30) including pixels and a logic circuit (e.g., 20) controlling the pixel array. The logic circuit may input an optical control signal of the light source and a photo control signal, having a predetermined phase difference, to pixels of the sensor to obtain raw data.

In an example embodiment, the logic circuit transfers the first raw data A0 to the fourth raw data A3, as described above with reference to FIG. 7, to the image signal processor as input data 201. Alternatively, the logic circuit may calculate a difference between the first raw data A0 and the third raw data A2 and a difference between the second raw data A1 and the fourth raw data A3 and transfer the calculated differences to the image signal processor as the input data 201.

The frequency conversion module 210 may convert the input data 201 into data in a frequency domain using a method such as a Fourier transform. The data, converted into the frequency domain, may be filtered by the low-pass filter 220. The low-pass filter 220 may generate low-frequency data corresponding to or lower than a predetermined reference frequency and may output the low-frequency data to the weighting operational module 230.

The weighting operational module 230 may determine a weighting to be applied to the low-frequency data with reference to a size of the low-frequency data appearing in the low-frequency band lower than or equal to the reference frequency. According to an example embodiment of the inventive concept, the weighting operational module 230 performs an inverse Fourier transform on the low-frequency data output from the low pass filter 220 to generate a result and applies a weighting to the result to generate weighted low-frequency data. As an example, the weighting may be uniformly applied in the low-frequency band or may be differently applied according to a plurality of sub-bands formed by dividing the low-frequency band. The low-frequency band may be divided into sub-bands based on a size of the low-frequency data. In an example embodiment, the weighting is selectively applied to only a portion of the low-frequency data having a size greater than a predetermined threshold value.

The image generation module 240 may synthesize the weighted low-frequency data with the input data 201 to generate a resultant image 202. As described above with reference to FIGS. 6 and 7, the effect of the optical noise signal, generated due to reflection and/or scattering in the imaging device 200, may be uniformly reflected on pixels included in the imaging device 200. Therefore, when the input data 201 is converted into a frequency domain, the effect of the optical noise signal may mainly appear in the low-frequency band. As a result, a size of the low-frequency data corresponding to the low-frequency band may be reduced by applying a weighting, less than 1, to the low-frequency data to significantly reduce an error in depth information appearing in the resultant image 202 due to the optical noise signal.

In an example embodiment of the inventive concept, a reference frequency of the low-pass filter 220 and a weighting, applied to the low-frequency data by the weighting operational module 230, may be determined in relation to each other. For example, when the reference frequency is set to be high, a weighting may be applied to raw data, included in a relatively high frequency band, to reduce a size of the raw data. Meanwhile, when the reference frequency is set to be low, a weighting may be applied to only raw data included in a significantly narrow or low frequency band.

Therefore, the reference frequency and the weighting may be determined in relation to each other to significantly reduce degradation in quality of the resultant image while effectively eliminating the effect of the optical noise signal caused by reflection and/or scattering. As an example, when the reference frequency is set to be high, the weighting may be decreased. Therefore, a significantly large weighting is applied to a region, in which the effect of the optical noise signal hardly appears, to prevent deterioration in the quality of the resultant image. On the other hand, when the reference frequency is set to be low, the weighting may be increased. Therefore, the effect of the optical noise signal may be more reliably eliminated.

Alternatively, according to example embodiments, different kernels may be applied in a process of low-pass filtering the input data 201 converted into a frequency domain. As an example, the input data 201 converted into the frequency domain may be low-pass filtered using a first kernel and a second kernel different from each other. The low-pass filtering using the first and second kernels may include a convolution operation.

In an example embodiment of the inventive concept, different reference frequencies and different weighting may be applied to the input data 201 in the low-pass filtering by the first kernel and the second kernel. The image generation module 240 may generate a resultant image 202 using low-frequency data and input data 201 filtered by the first kernel and the second kernel. According to an example embodiment of the inventive concept, the weighting operational module 230 applies weightings to the low-frequency data filtered by the first kernel and the second kernel. The weighting operational module 230 may apply the same weighting or different weightings to the first low-frequency data filtered by the first kernel and the second low-frequency data filtered by the second kernel.

Figure 10:
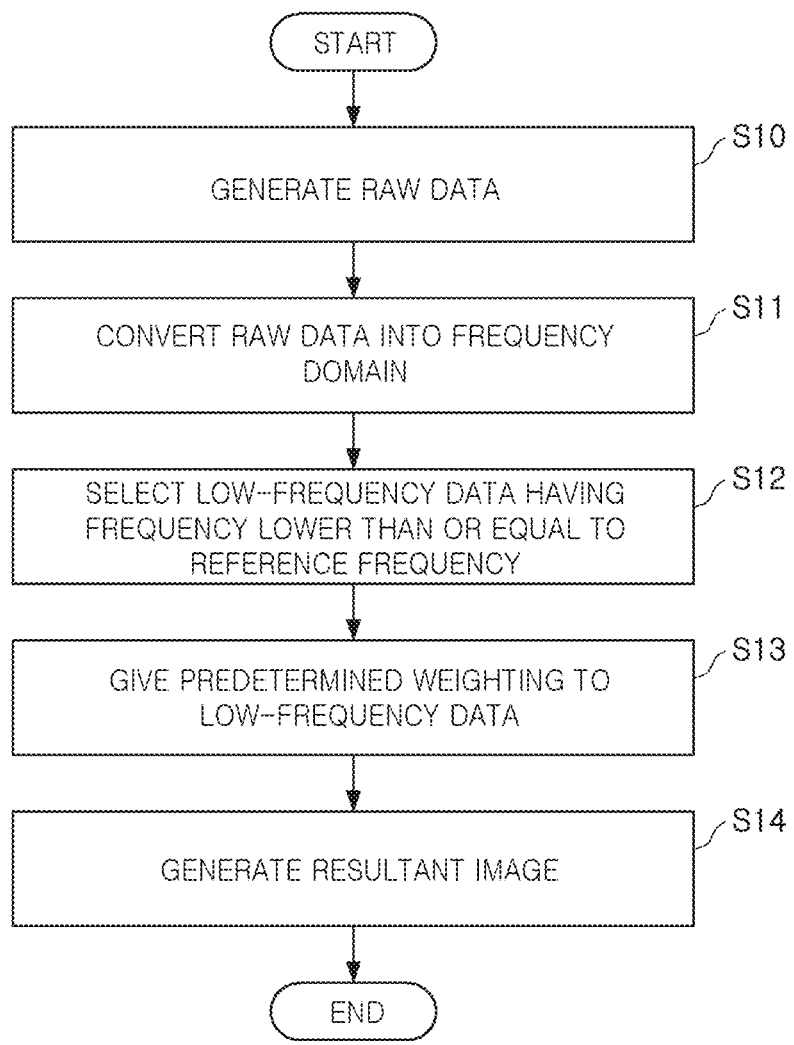
FIG. 10 is a flowchart illustrating an operation of an imaging device according to an example embodiment of the inventive concept.

FIG. 10 is a flowchart illustrating an operation of an imaging device according to an example embodiment of the inventive concept.

Referring to FIG. 10, the operation of the imaging device according to an example embodiment of the inventive concept generates raw data (S10). While a light source operates under control if an optical control signal having a predetermined frequency and a predetermined duty ratio, pixels of a sensor may generate an electrical signal in response to a light reception signal reflected from a subject and a background. The electrical signal may be generated by a plurality of photo control signals input to the pixels having a predetermined phase difference from the optical control signal. Logic circuits connected to the pixels may process the electrical signal to generate the raw data.

The raw data is transmitted from a sensor to an image signal processor, and the image signal processor converts the raw data into a frequency domain (S11). As an example, the image signal processor may convert the raw data into a frequency domain using a Fourier transform.

The image signal processor selects low-frequency data of the frequency domain, having a reference frequency or a frequency lower than the reference frequency (S12). When raw data for generating a depth image is converted into a frequency domain, a high-frequency band corresponds to an area, in which a large change occurs, such as the edges of the subject and the background and the low-frequency band may correspond to an area in which a change gradually occurs. Accordingly, an effect of an optical noise signal generated by reflection and/or scattering of the imaging device may be mostly included in low-frequency data.

The image signal processor gives (e.g., applies) a predetermined weighting to the low-frequency data (S13). The weighting may be selected as a value smaller than 1 to reduce the effect of the optical noise signal. For example, the weighting may be applied to the low-frequency data to generate weighted low-frequency data. The image signal generates a resultant image using the weighted low-frequency data and the raw data (S14).

Hereinafter, an operation of an imaging device will be described in detail.

Figure 11A:
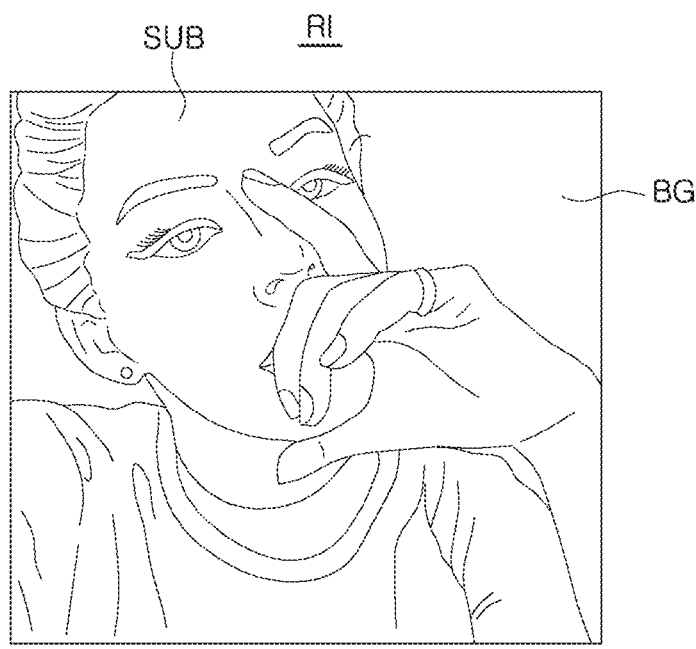
FIGS. 11A and 11B are exemplary images illustrating an operation of an imaging device according to an example embodiment of the inventive concept.
Figure 11B:
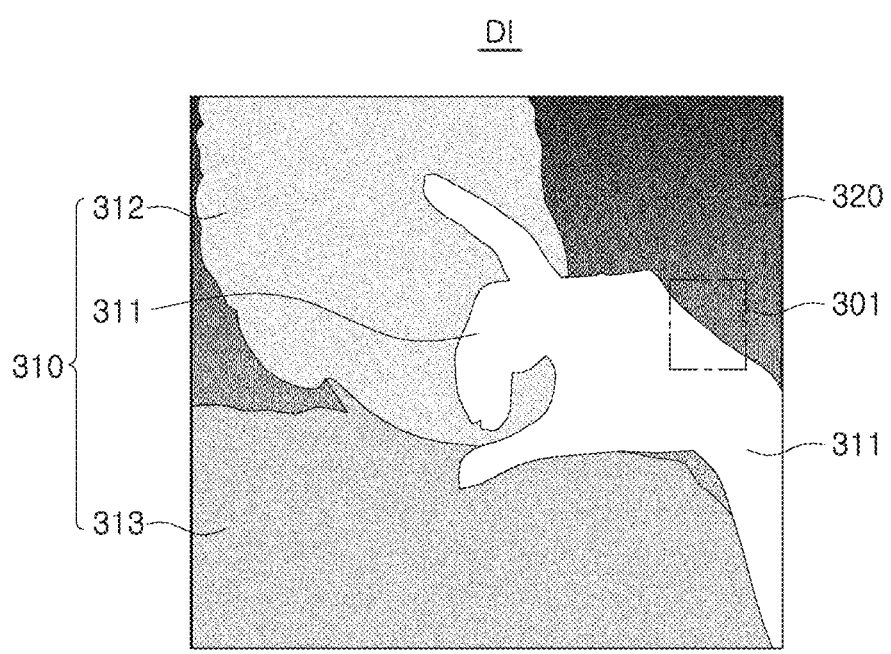

FIGS. 11A and 11B are exemplary images illustrating an operation of an imaging device according to an example embodiment of the inventive concept.

FIGS. 11A and 11B show a real image RI and a depth image DI capturing the same scene, respectively. A subject SUB and a background BG are included in the real image RI. In the depth image DI, a subject SUB and a background BG may be expressed as depth information corresponding to a distance from the imaging device. Referring to FIG. 11B, the depth image DI includes a first region 310 corresponding to the subject SUB and a second region 320 corresponding to the background BG. The first region 310 and the second region 320 may be represented by different colors and/or brightnesses.

The first area 310 corresponding to the subject SUB may be divided into a first portion 311, a second portion 312, and a third portion 313 according to depth information. The first portion 311, the second portion 312, and the third portion 313 may be represented by different colors or brightnesses. In the example embodiment illustrated in FIG. 11, the first portion 311, corresponding to a hand of a person who is the subject SUB, is closest to the imaging device, and thus, is represented by a first brightness (e.g., a highest brightness). The second portion 312, corresponding to a face of the person, is darker than the first portion 311 and brighter than the third portion 313 and is represented by second brightness. The third portion 313, corresponding to a body of the person farthest from the imaging device, is represented by third brightness, darkest in the subject SUB. For example, the second brightness is brighter than the third brightness and darker than the first brightness.

Referring to FIG. 11B, in the depth image DI, a fourth portion corresponding to the background BG may be represented by one brightness. This may be because there is no significant difference in depth information of the background BG, or the imaging device does not divide depth information included in the background BG. According to other embodiments, the background BG may also be represented by various colors or brightnesses depending on the depth information.

In an ideal case, the depth image DI is generated by a light reception signal reflected from the subject SUB and the background BG and then incident into pixels of the imaging device. However, in an actual operation of the imaging device, in addition to the light reception signal, an optical noise signal generated by reflection and/or scattering may be incident into the pixels of the imaging device. Therefore, an error may occur in depth information included in the depth image DI. Hereinafter, a description will be made with reference to FIGS. 12A and 12B.

Figure 12A:
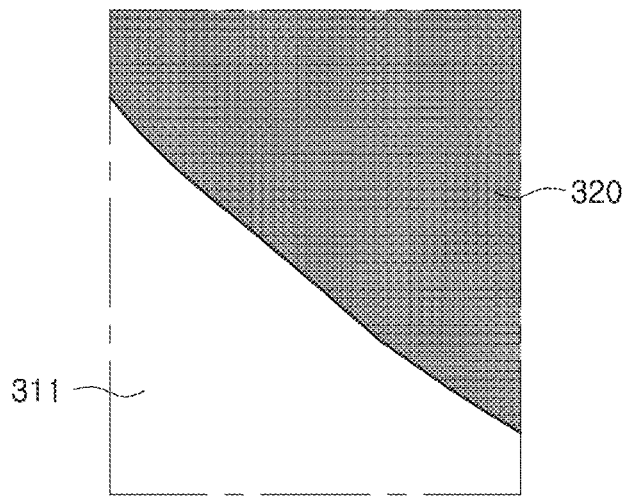
FIGS. 12A and 12B are enlarged views of portions of an image according to an example embodiment shown in FIG. 11B.
Figure 12B:
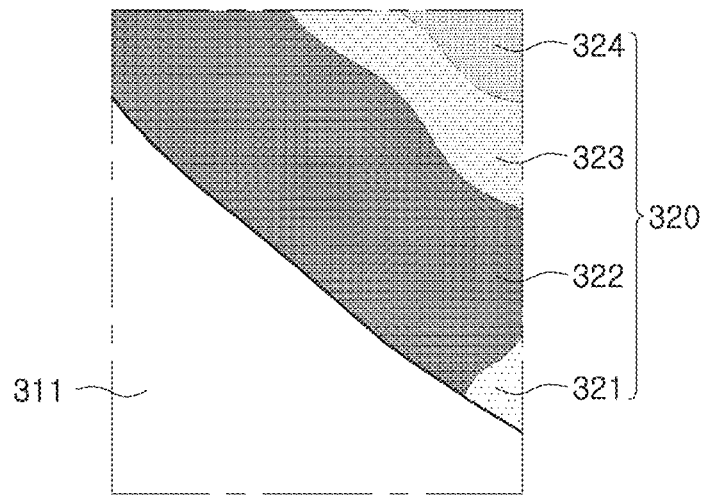

FIGS. 12A and 12B are enlarged views of portions of an image shown in FIG. 11B according to an example embodiment.

FIGS. 12A and 12B are enlarged views of a certain region 301 of the depth image DI illustrated in FIG. 11B. FIG. 12A corresponds to an ideal case in which there is no error caused by an optical noise signal, and FIG. 12B may correspond to a case in which an optical noise signal is introduced into pixels to cause an error in depth information.

Referring to FIG. 11B, enlarged certain regions 301 in FIGS. 12A and 12B include a first portion 311, corresponding to a hand of the subject SUB, and a second portion 320 corresponding to the background BG. Referring to FIG. 12A illustrating the ideal case, a boundary between the first portion 311 and the second region 320 is apparent and depth information of the first portion 311 and the second region 320 is also clearly expressed.

Referring to FIG. 12B illustrating the case in which an optical noise signal is introduced into pixels, a depth image may be generated to be different from actual depth information due to an effect of the optical noise signal. Referring to FIG. 12B, a second region 320 corresponding to the background BG is divided into a plurality of regions 321 to 324 indicated by different colors and/or hatchings. For example, a second region, which should be indicated as one depth information because depth information is incorrectly calculated due to the effect of the optical noise signal, may be indicated as a plurality of regions 321 to 324 having different depth information.

In an example embodiment of the inventive concept, to address the above issue, raw data for generating a depth image is converted into a frequency domain and only low-frequency data in a low-frequency band is selected and the selected data is weighted. As described above, the effect of the optical noise signal is reflected on the entire pixels, and thus, most of the effect may be included in the low-frequency data. The error of depth information may be significantly reduced by selecting low-frequency data and applying a weighting (e.g., less than 1), to exclude the effect of the optical noise signal.

Figure 13:
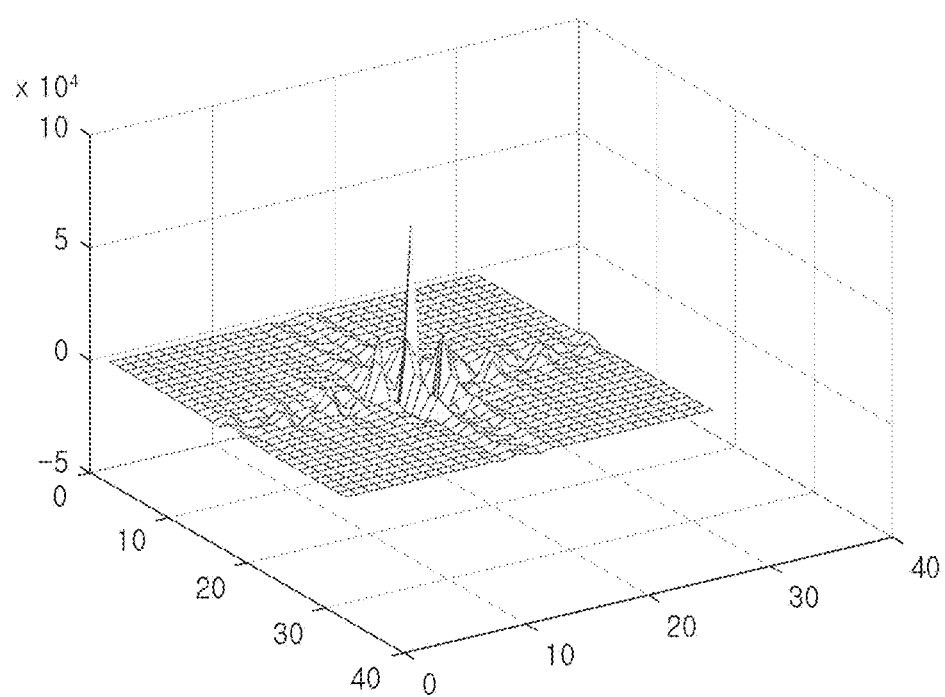
FIGS. 13 and 14 show data of a frequency domain generated in an imaging device according to an example embodiment of the inventive concept.
Figure 14:
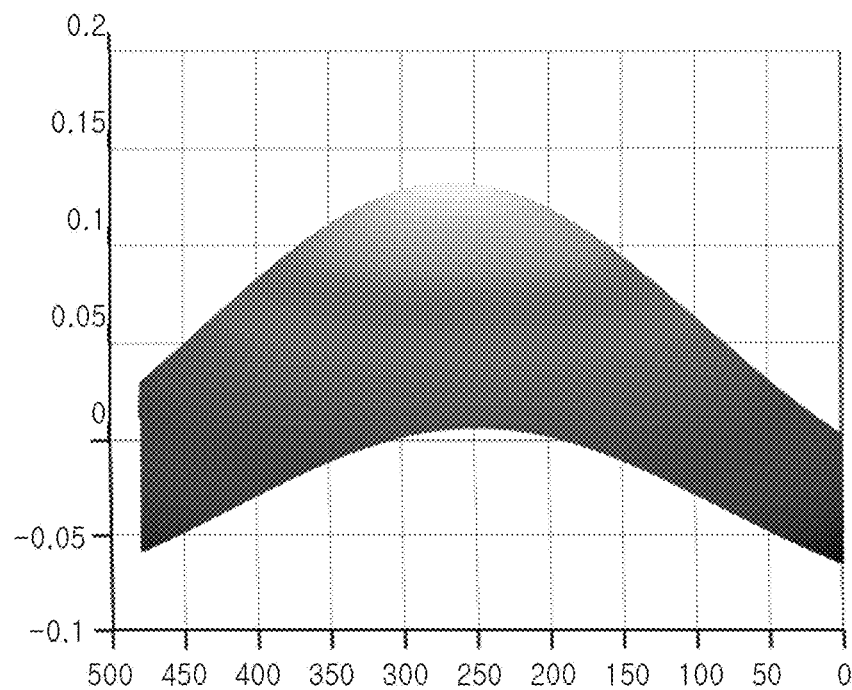

FIGS. 13 and 14 show data of a frequency domain generated in an imaging device according to an example embodiment of the inventive concept.

FIG. 13 is a diagram illustrating a result of converting raw data, generated and transferred to an image signal processor by a sensor of an imaging device, into a frequency domain. Raw data for generating the depth image may be data defined in a spatial domain, and FIG. 13 illustrates a result of converting the raw data, defined in the spatial domain, into a frequency domain. As an example, the imaging device may convert raw data from a spatial domain to a frequency domain using a Fourier transform. In a frequency domain generated using a Fourier transform, the raw data may be represented by a sine function and/or a cosine function having various amplitudes and phases.

An image signal processor may perform low-pass filtering on the raw data converted into a frequency domain. As an example, the low-pass filtering may be performed using a Gaussian kernel. FIG. 14 is a diagram showing low-frequency data passing through a low-pass filter.

The image signal processor may apply a predetermined weighting to the low-frequency data generated as shown in FIG. 14. The low-frequency data represents a gradual change of the depth image, and an effect of the optical noise signal on a plurality of pixels may be reflected in the low-frequency data. By weighting the low-frequency data to generated weighted data and merging (or combining) the weighed data with raw data, a depth image may be generated to significantly reduce the effect of the optical noise signal and to improve the quality of the depth image.

Figure 15:
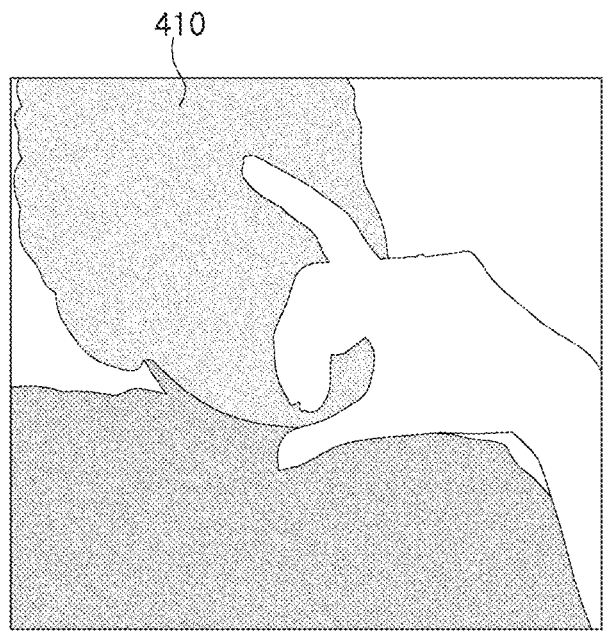
FIGS. 15 and 16 illustrate an operation of an imaging device according to an example embodiment of the inventive concept.
Figure 16:
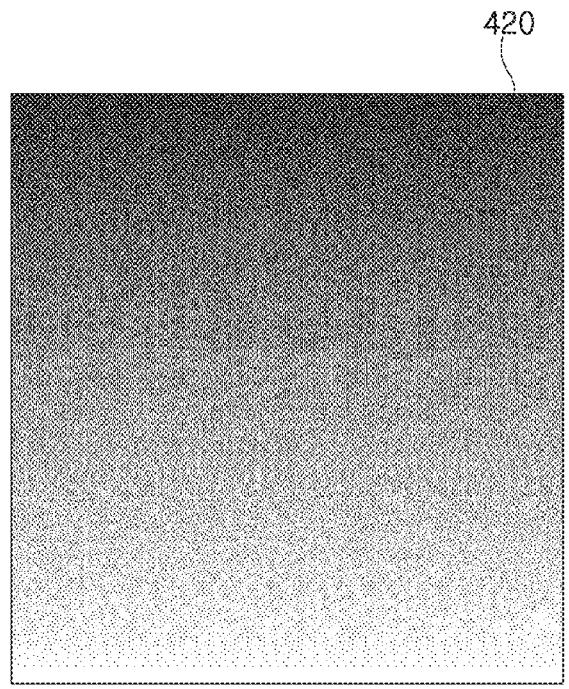

FIGS. 15 and 16 illustrate an operation of an imaging device according to an example embodiment of the inventive concept.

FIGS. 15 and 16 illustrate that a first area 410 corresponding to a subject and a second area 420 corresponding to a background are separated in raw data for generating a depth image. As described above, the raw data may be divided into data having information of a depth smaller than a predetermined reference depth and data having information of a depth larger than the reference depth to distinguish the first area 410 and the second area 420 from each other. As illustrated in FIGS. 15 and 16, the first area 410 and the second area 420 may be separated from each other and only the second area 420 is converted into a frequency domain, or a portion of the first area 410 and at least a portion of the second area 420 are selectively converted into a frequency domain, and thus, the operational amount of the imaging device may be reduced. When the second area 420 is converted into the frequency domain or when a portion of the first area 410 and at least a portion of the second area 420 are selectively converted into the frequency domain, performing low-pass filtering on the data converted into the frequency domain may be omitted.

As an example, an effect of the optical noise signal in the frequency domain is mostly included in low-frequency data, and a significant portion of the low-frequency data may be included in the second area 420, rather than the first area 410. Depth information of the subject may be smaller than depth information of the background. Accordingly, depth information may be generated using raw data defined in a spatial domain and the depth information may be compared with a predetermined reference depth to divide the first area 410 corresponding to the subject and the second area 420 corresponding to the background.

After converting raw data into a frequency domain and selecting low-frequency data of the frequency domain, the imaging device may determine a weighting to be given to the low-frequency data. In this case, a weighting for the low-frequency data is applied to only the second area 420 and not applied to the first area 410. Thus, the operational amount of the imaging device may be reduced and speed, at which the imaging device generates a resultant image, may be improved.

Additionally, in an example embodiment of the inventive concept, the imaging device divides raw data of the spatial domain into a first region area 410 and a second area 420 using a predetermined reference depth and converts only at least a portion of the second area corresponding to the background into a frequency domain. Alternatively, considering that data of a low frequency band may be present in the subject, at least a portion of the first area 410 and at least a portion of the second area 420 may be selected and converted into a frequency domain. The reference depth may be changed to appropriately select an object to be converted into a frequency domain, among raw data defined in the spatial domain.

Since a portion of the raw data, converted into the frequency domain by the above process, mostly corresponds to a low-frequency band, low-pass filtering may be omitted. The imaging device may determine a weighting based on a size of the low-frequency data generated by converting a portion of the raw data into a frequency domain, and may apply the weighting to only the second region 420 to generate a resultant image.

Figure 17:
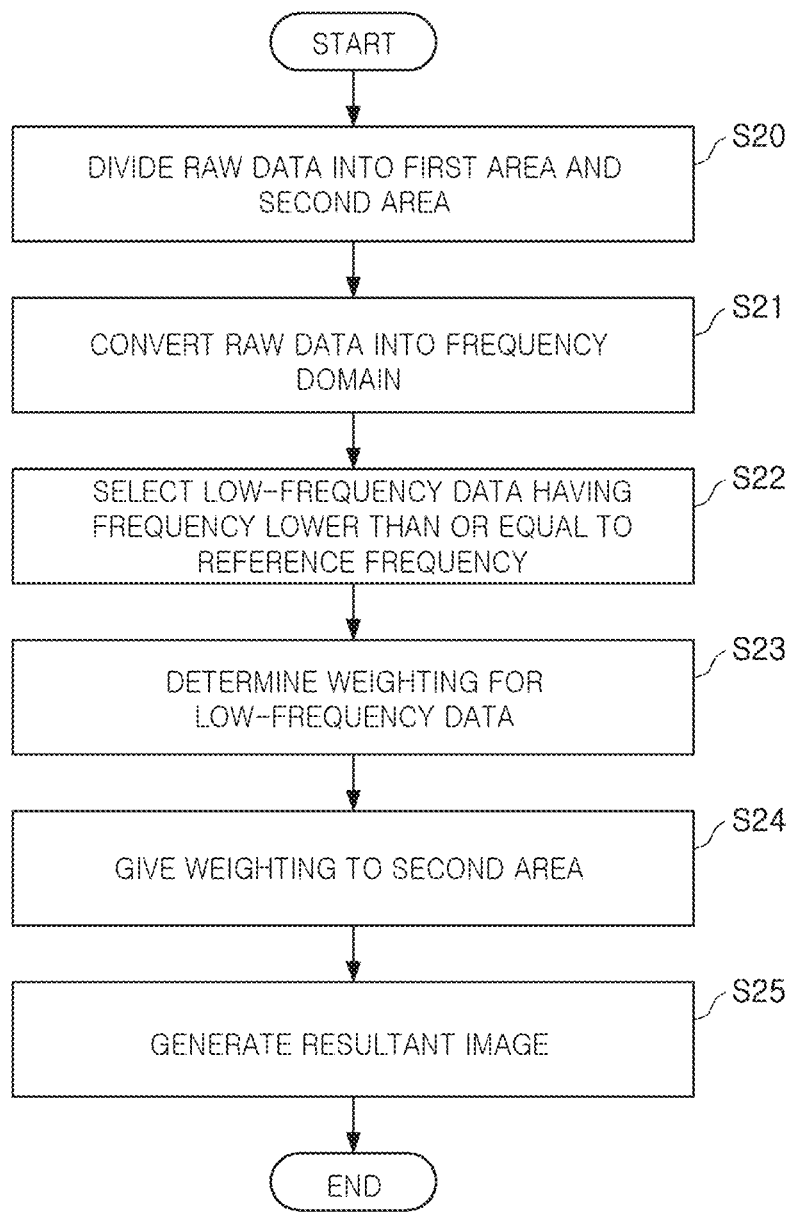
FIG. 17 is a flowchart illustrating an operation of an imaging device according to an example embodiment of the inventive concept.

FIG. 17 is a flowchart illustrating an operation of an imaging device according to an example embodiment of the inventive concept.

Referring to FIG. 17, an operation of the imaging device according to an example embodiment of the inventive concept divides raw data into a first area and a second area (S20). The raw data may be data defined in a spatial domain and may include coordinates of each pixel. Each of the pixels may output part of the raw data in response to photo control signals having different phases. As an example, depth information may be calculated from data included in the raw data, and may be then compared with a reference depth to be divided into a first area and a second area. In an example embodiment of the inventive concept, the first area is an area in which depth information is smaller than the reference depth, and the second area is an area in which depth information is larger than the reference depth.

The imaging device converts the raw data into a frequency domain (S21). As described above, raw data may be converted from a spatial domain to a frequency domain using a Fourier transform. Low-frequency data, belonging to a reference frequency band or a frequency band lower than the reference frequency band, is selected (S22).

The imaging device determines a weighting for the low-frequency data (S23). The image device gives (or applies) the weighting, determined in operation S23, to the raw data included in the second area (S24). The second area includes large depth information, for example, an area corresponding to a background in a depth image, and an effect of the optical noise signal may be greater in the second area than in the first area. The imaging device generates a resultant image using the weighted raw data of the second area and the raw data of the first area (S25).

As described above, according to example embodiments, the operation of the imaging device may be modified in various ways. For example, in operation S21, the second area or a portion of the first area and a portion of the second area, rather than the entire first and second areas, may be selected to be converted into a frequency domain. In this case, operation S22 corresponding to low-pass filtering may be omitted. Additionally, in operation of step S24 in which the weighting is given, the weighting may also be given to a portion of the first area in addition to the second area.

Figure 18:
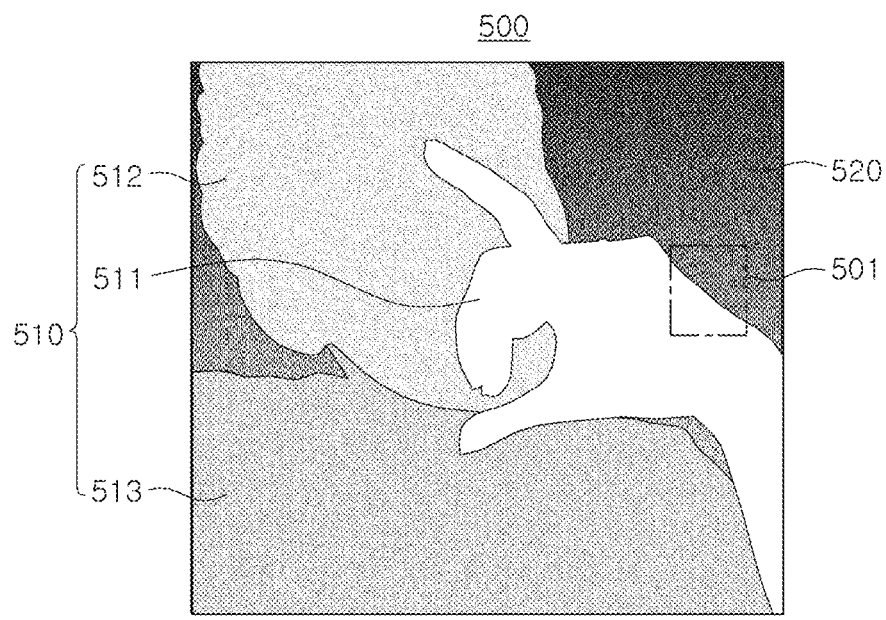
FIGS. 18 and 19 are resultant images generated in an imaging device according to an example embodiment of the inventive concept.
Figure 19:
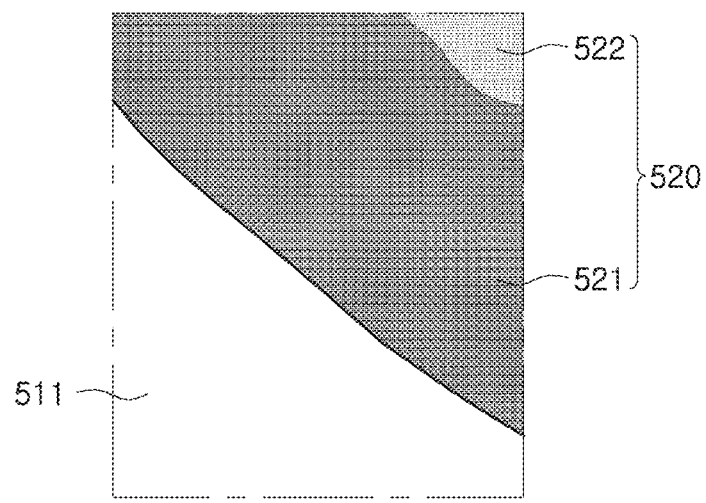

FIGS. 18 and 19 are resultant images generated in an imaging device according to an example embodiment of the inventive concept.

FIGS. 18 and 19 are diagrams illustrating a resultant image 500 generated by converting raw data into a frequency domain and selectively applying a weighting to only low-frequency data using a method according to example embodiments.

Referring to FIG. 18, the resultant image 500 includes a first area 510 corresponding to a subject and a second area 520 corresponding to a background, and the first area 510 includes a first portion 511, a second portion 512, and a third portion 513 depending on a difference in depth information. As an example, in the first area 510, the first portion 511 may be closest to the imaging device and the third portion 513 may be farthest from the imaging device.

Referring to FIG. 19, an enlarged view of an area 501 of FIG. 18 includes a first portion 511 corresponding to a hand of a subject and a second area 520 corresponding to a background. An error, caused by an effect of the optical noise signal, or the like, may mainly appear in low-frequency data. Therefore, an error of depth information may mainly appear in the second area 520. When the error of the depth information is not corrected, a background having almost uniform depth information may be shown as being divided into a plurality of areas 321 to 324 having different depth information.

Referring to FIG. 19, an error occurring in the second area 520 due to an optical noise signal, or the like, may be reduced. Due to a weighting applied to low-frequency data, the second area 520 may be divided into a first section 521 and a second section 522 to reduce an error of depth information, as compared with the example embodiment illustrated in FIG. 12B.

Figure 20:
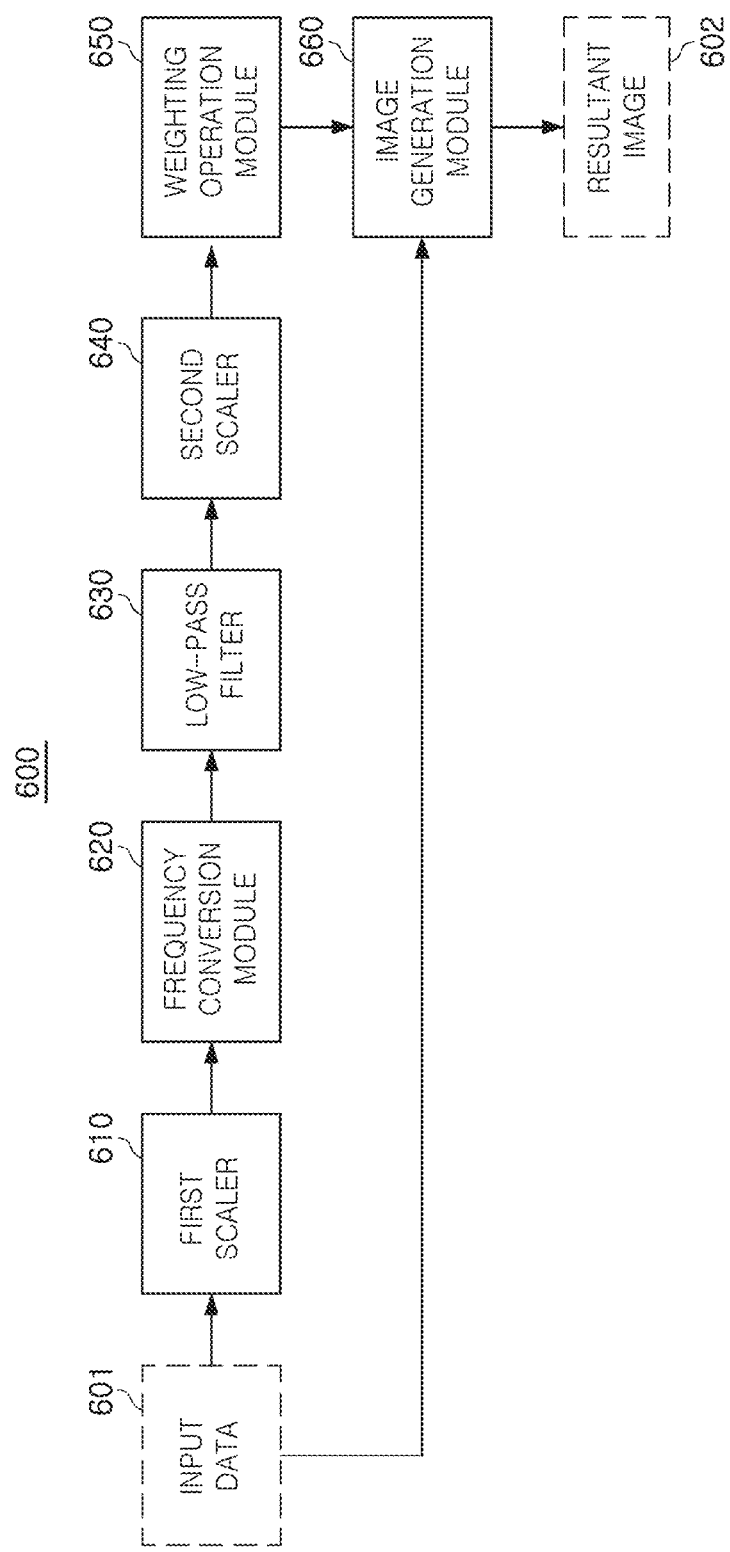
FIG. 20 is a schematic block diagram of an imaging device according to an example embodiment of the inventive concept.

FIG. 20 is a schematic block diagram of an imaging device according to an example embodiment of the inventive concept.

Referring to FIG. 20, an imaging device 600 according to an example embodiment of the inventive concept includes a first scaler 610, a frequency conversion module 620, a low-pass filter 630, and a second scaler 640, a weighting operation module 650, and an image generation module 660. In an example embodiment, the first scaler 610, the frequency conversion module 620, the low-pass filter 630, the second scaler 640, the weighting operational module 650, and the image generation module 660 may be implemented in software or hardware, and may be mounted in an image signal processor of the imaging device 600.

The operations of the frequency conversion module 620, the low-pass filter 630, the weighting operational module 650, and the image generation module 660 may be similar to those described above with reference to FIG. 9. In the example embodiment illustrated in FIG. 20, the imaging device further includes a first scaler 610 and a second scaler 640. The first scaler 610 may downscale input data 601, and the second scaler 640 may upscale low-frequency data output from the low-pass filter 630. The operational amount of the imaging device 600 may be reduced by downscaling the input data 601 using the first scaler 610 and performing frequency conversion on the downscaled data to generate data in a frequency domain and low-pass filtering the data of the frequency domain to generate low-pass filtered low-frequency data. In addition, a deterioration in the quality of the resultant image 602 may be prevented by upscaling the low-pass filtered low-frequency data and calculating a weighting.

Figure 21:
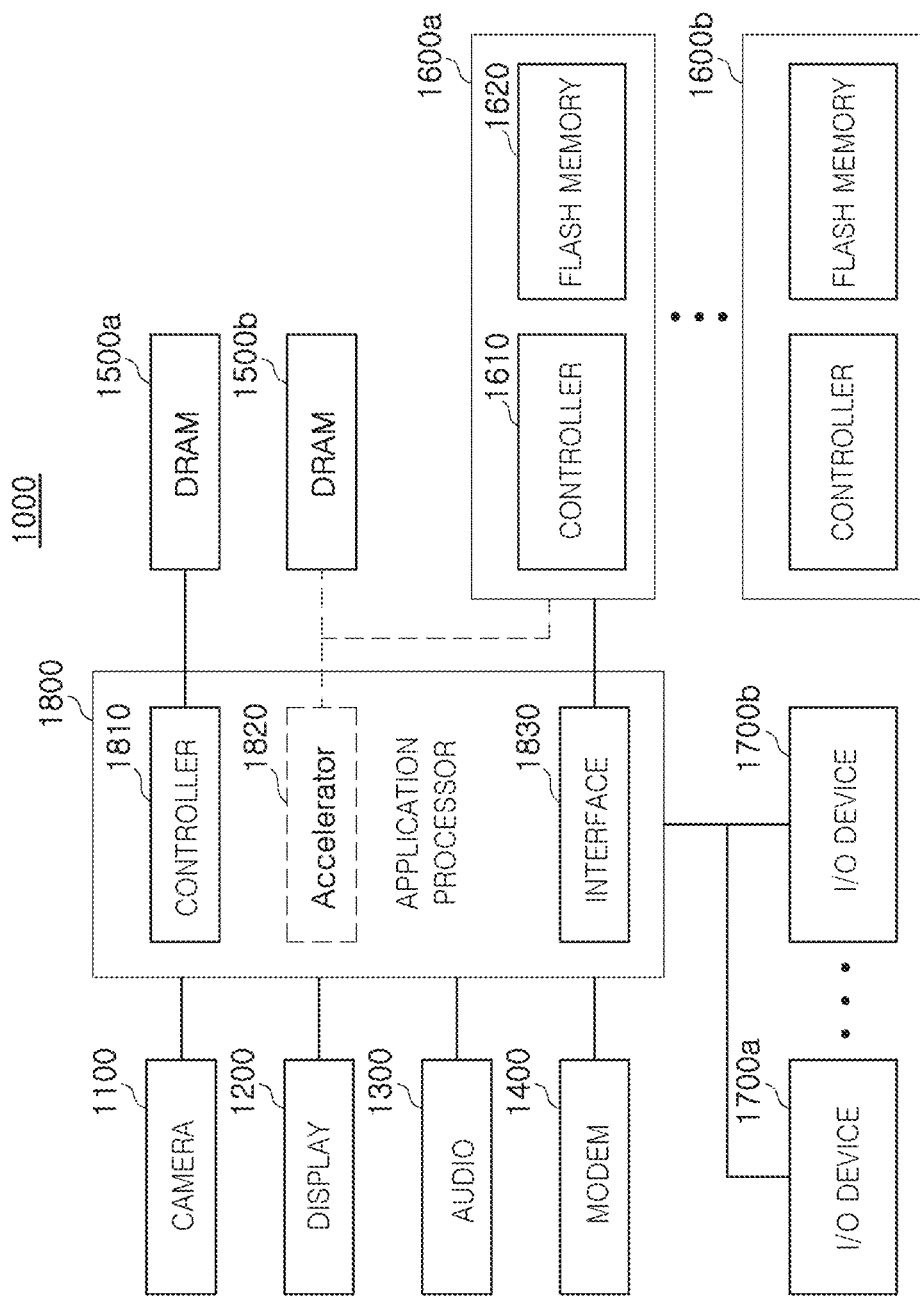
FIG. 21 is a schematic block diagram of an electronic device including a memory device according to an example embodiment of the inventive concept.

FIG. 21 is a schematic block diagram of an electronic device including a memory device according to an example embodiment of the inventive concept.

Referring to FIG. 21, a mobile system 1000 includes a camera 1100, a display 1200, an audio processing unit 1300, a modem 1400, DRAMs 1500a and 1500b, flash memory devices 1600a and 1600b, input/output (I/O) devices 1700a and 1700b, and an application processor (hereinafter referred to as "AP") 1800.

The mobile system 1000 may be implemented as a laptop computer, a portable terminal, a smartphone, a tablet personal computer (PC), a wearable device, a healthcare device, or an Internet-of-Things (IoT) device. Also, the mobile system 1000 may be implemented as a server or a PC.

The camera 1100 may capture a still image or a video under the user's control. The mobile system 1000 may obtain specific information using still image/video captured by the camera 1100, or may convert and store the still image/video into other types of data such as text. Alternatively, the mobile system 1000 may recognize a character string included in the still image/video captured by the camera 1100, and may provide a text or audio translation corresponding to the character string. As described above, the camera 1100 in the mobile system 1000 tends to be used in various fields of application. In an example embodiment, the camera 1100 may transmit data, such as a still image/video, to the AP 1800 according to a D-PHY or C-PHY interface in the MIPI standard.

The camera 1100 may include a plurality of cameras having different viewing angles or aperture values. The camera 1100 may further include a camera generating a depth image using depth information of a subject and/or a background, in addition to a camera capturing a subject and generating a real image. Raw data, generated by the camera for generating the depth image, may be converted into a frequency domain by an image signal processor included in the camera 1100 or the AP 1800, and the image signal processor may selectively extract raw data in the frequency domain in a low-frequency band to give a weighting. Due to the above-described operation, an effect caused by an optical noise signal, or the like, reflected and/or scattered in the camera 1100, in addition to a light reception signal reflected from the subject and/or background, may be significantly reduced to improve accuracy of a depth image.

The display 1200 may be implemented in various forms such as a liquid crystal display (LCD), an organic light emitting diodes (OLED) display, an active-matrix organic light emitting diodes (AMOLED) display, a plasma display panel (PDP), a field emission display (FED), an electronic paper, and the like. In an example embodiment of the inventive concept, the display 1200 provides a touchscreen function to be also used as an input device of the mobile system 1000. In addition, the display 1200 may be integrated with a fingerprint sensor, to provide a security function of the mobile system 1000. In an example embodiment of the inventive concept, the AP 1800 may transmit image data to the display 1200, to be displayed on the display 1200 according to the D-PHY or C-PHY interface in the MIPI standard.

The audio processing unit 1300 may process audio data, stored in flash memory devices 1600a and 1600b, or audio data included in contents externally received through a modem 1400 or the I/O devices 1700a and 1700b. For example, the audio processing unit 1300 may perform various processes such as coding/decoding, amplification, and noise filtering, on the audio data.

The modem 1400 may modulate a signal and transmit the modulated signal to transmit and receive wired/wireless data, and may demodulate an externally received signal to restore an original signal. The I/O devices 1700a and 1700b may provide digital input and output, and may include an input device, such as a port connectable to an external recording medium, a touchscreen, or a mechanical button key, and an output device, capable of outputting a vibration in a haptic manner. In certain examples, the I/O devices 1700a and 1700b may be connected to an external recording medium through a port such as a USB, a lightning cable, an SD card, a micro SD card, a DVD, or a network adapter.

The AP 1800 may control the overall operation of the mobile system 1000. Specifically, the AP 1800 may control the display 1200 to display a portion of the contents, stored in the flash memory devices 1600*a* and 1600*b*, on a screen. When a user input is received through the I/O devices 1700*a* and 1700*b*, the AP 1800 may perform a control operation corresponding to the user input.

The AP 1800 may be provided as a system-on-chip (SoC) driving an application program or an operating system (OS). In addition, the AP 1800 may be included in a single semiconductor package together with other devices included in the mobile system 1000, for example, a DRAM 1500*a*, a flash memory 1620, and/or a memory controller 1610. For example, the AP 1800 and at least one device may be provided in a package form such as Package on Package (PoP), Ball grid arrays (BGAs), Chip scale packages (CSPs), System In Package (SIP), Multi Chip Package (MCP), Wafer-level Fabricated Package (WFP), or a wafer in the form of a package such as a Level Processed Stack Package (WSP). A kernel of the operating system, driven on the AP 1800, may include an input/output scheduler and a device driver for controlling the flash memory devices 1600*a* and 1600*b*. The device driver may control access performance of the flash memory devices 1600*a* and 1600*b* with reference to the number of synchronous queues managed by the input/output scheduler, or may control a CPU mode inside the SoC and a dynamic voltage and frequency scaling (DVFS) level.

In an example embodiment, the AP 1800 includes a processor block, executing an operation or driving an application program and/or an operating system, and various other peripheral elements connected through a system block and a system bus. The peripheral elements may include a memory controller, an internal memory, a power management block, an error detection block, and a monitoring block. The processor block may include one or more cores. When a plurality of cores are included in the processor block, each of the cores may include a cache memory and a common cache, shared by the cores.

In an example embodiment of the inventive concept, the AP 1800 includes an accelerator block 1820. The accelerator block 1810 may be a specific-purpose circuit for artificial intelligence (AI) data operation. Alternatively, according to an example embodiment, a separate accelerator chip may be provided to be separated from the AP 1800, and a DRAM 1500*b* may be additionally connected to the accelerator block 1820 or an accelerator chip. The accelerator block 1820 may be a functional block specialized in performing specific functions of the AP 1800, and may include a graphics processing unit (GPU) serving as a functional block specialized in processing graphics data, a neural processing unit (NPU) serving as a functional block specialized in performing AI computation and inference, or a data processing unit (DPU) serving as a functional block specialized in transmitting data.

According to an example embodiment of the inventive concept, the mobile system 1000 may include a plurality of DRAMs 1500*a* and 1500*b*. In an example embodiment of the inventive concept, the AP 1800 includes a controller 1810 for controlling the DRAM 1500*a* and 1500*b*, and the DRAM 1500*a* may be directly connected to the AP 1800.

The AP 1800 may set a command and a mode register set (MRS) command according to the JEDEC standard to control a DRAM, or may set specifications and functions required by the mobile system 1000, such as a low voltage, high speed, and reliability, and a DRAM interface protocol for CRC/ECC to perform communication. For example, the AP 1800 may set a new DRAM interface protocol to control the DRAM 1500*b* for an accelerator, in which an accelerator block 1820 or an accelerator chip provided independently of the AP 1800 has a higher bandwidth than the DRAM 1500*a*, to perform communication.

While DRAMs 1500*a* and 1500*b* are illustrated in FIG. 21, a configuration of the mobile system 1000 is not necessarily limited thereto. According to bandwidth and reaction speed of the AP 1800 and the accelerator block 1820 and voltage conditions, memories other than the DRAMS 1500*a* and 1500*b* may be included in the mobile system 1000. As an example, the controller 1810 and/or the accelerator block 1820 may control various memories such as PRAM, SRAM, MRAM, RRAM, FRAM, or Hybrid RAM. The DRAMs 1500*a* and 1500*b* have relatively lower latency and higher bandwidth than input/output devices 1700*a* and 1700*b* or flash memory devices 1600*a* and 1600*b*. The DRAMs 1500*a* and 1500*b* may be initialized at a power-on point in time of the mobile system 1000. When an operating system and application data are loaded, the DRAMs 1500*a* and 1500*b* may be used as locations, in which the operating system and application data are temporarily stored, or as spaces in which various software codes are executed.

Four fundamental arithmetic operations such as addition, subtraction, multiplication, and division, a vector operation, an address operation, or FFT operation data may be stored in the DRAMs 1500*a* and 1500*b*. In an example embodiment, the DRAMs 1500*a* and 1500*b* may be provided as a processing in memory (PIM) having an operational function. For example, a function used to perform inference in the DRAMs 1500*a* and 1500*b* may be performed. In this case, the inference may be performed in a deep learning algorithm using an artificial neural network. The deep learning algorithm may include a training step, in which a model is learned using various training data, and an inference step in which data is recognized (or classified) using the trained model. For example, a function used in the inference may include a hyperbolic tangent function, a sigmoid function, or a rectified linear unit (ReLU) function.

According to an example embodiment of the inventive concept, an image captured by a user through the camera 1100 is signal-processed and stored in the DRAM 1500*b*, and the accelerator block 1820 or the accelerator chip performs an AI data operation using the data stored in the DRAM 1500*b* and the function used in the inference to recognize data.

According to an example embodiment, the mobile system 1000 may include a plurality of storage or a plurality of flash memory devices 1600*a* and 1600*b* having a capacity higher than a capacity of the DRAMs 1500*a* and 1500*b*. The flash memory devices 1600*a* and 1600*b* may include a controller 1610 and a flash memory 1620. The controller 1610 may receive a control command and data from the AP 1800, and may write data to the flash memory 1620 in response to the control command or may read data stored in the flash memory 1620 and transmit the read data to the AP 1800.

According to an example embodiment of the inventive concept, the accelerator block 1820 or the accelerator chip may perform a training step and an AI data operation using the flash memory devices 1600*a* and 1600*b*. In an exemplary embodiment, an operational logic, capable of performing a predetermined operation in the flash memory devices 1600*a* and 1600*b*, may be implemented in the controller 1610. Instead of the AP 1800 and/or the accelerator block 1820, the operational logic may perform at least a portion of the training step and the inference step, performed by the AP 1800 and/or the accelerator block 1820, using the data stored in the flash memory 1620.

In an example embodiment of the inventive concept, the AP 1800 includes an interface 1830. Accordingly, the flash memory devices 1600*a* and 1600*b* may be directly connected to the AP 1800. For example, the AP 1800 may be implemented as an SoC, the flash memory device 1600*a* may be implemented as a chip independent of the AP 1800, and the AP 1800 and the flash memory device 1600*a* may be mounted in a single package. However, example embodiments of the inventive concept are not limited thereto, and the plurality of flash memory devices 1600*a* and 2600*b* may be electrically connected to the mobile system 1000 through a connection.

The flash memory devices 1600*a* and 2600*b* may store data such as a still image/video, captured by the camera 1100, or data received through a communications network and/or a ports included in the input and output devices 1700*a* and 1700*b*. For example, the flash memory devices 1600*a* and 1600*b* may store augmented reality/virtual reality, high definition (HD) or ultra high definition (UHD) contents.

At least one of the DRAMs 1500*a* and 1500*b* and the flash memory devices 1600*a* and 1600*b* may be implemented as memory devices according to example embodiments. As an example, at least one of the DRAMs 1500*a* and 1500*b* and the flash memory devices 1600*a* and 1600*b* may execute a verify operation every predetermined period according to example embodiments, and may execute a refresh operation and/or a repair operation, as necessary. Accordingly, operating performance and reliability of the mobile system 1000 may be improved.

As described above, according to at least one example embodiment of the inventive concept, the imaging device may convert raw data into a frequency domain and apply a weighting to low-frequency data of the frequency domain, having a predetermined reference frequency or a frequency lower than the reference frequency, to significantly reduce an error of the depth information appearing in a resultant image due to scattering. Thus, performance of the imaging device may be improved.

While example embodiments of the inventive concept have been shown and described above, it will be apparent to those of ordinary skill in the art that various modifications can be made to these embodiments without departing from the spirit and scope of the present inventive concept.

What is claimed is:

1. An imaging device comprising:
a light source operating in response to an optical control signal having a predetermined frequency;
a sensor including a plurality of pixels, configured to generate an electrical signal in response to a light reception signal output by the light source and reflected from a subject, and a logic circuit configured to generate first raw data of a spatial domain based on the electrical signal; and
an image signal processor configured to determine a subject area of the subject in the first raw data having a depth smaller than a predetermined reference depth and a background area of a background in the first raw data having a depth greater than the predetermined reference depth, to convert only the background area of the first raw data into second raw data of a frequency domain, to select low-frequency data of the second raw data within a frequency band lower than a predetermined reference frequency, to apply a predetermined weighting to the selected low-frequency data to generate weighted data of the background area, and to generate a resultant image based on the subject area of the first raw data and the weighted data of the background area,
wherein the predetermined weighting is set to reduce a magnitude of the selected low-frequency data.

2. The imaging device of claim 1, wherein the image signal processor comprises:
a frequency conversion module configured to apply a Fourier transform to the first raw data;
a low-pass filter configured to filter an output of the frequency conversion module to obtain the low-frequency data; and
a weighting operation module configured to apply the predetermined weighting to the low-frequency data.

3. The imaging device of claim 2, wherein the frequency conversion module, the low-pass filter, the weighting operation module, and the sensor are all located together within a single semiconductor device.

4. The imaging device of claim 2, wherein the frequency conversion module, the low-pass filter, and the weighting operation module are located within a semiconductor device and the sensor is located outside the semiconductor device.

5. The imaging device of claim 1, wherein the light source operates in response to a first optical control signal having a first frequency during a first light emitting time and operates in response to a second optical control signal having a second frequency different from the first frequency, during a second light emitting time different from the first light emitting time.

6. The imaging device of claim 1, wherein the light source includes a first light source operating in response to a first optical control signal having a first frequency, and a second light source operating in response to a second optical control signal having a second frequency different from the first frequency.

7. The imaging device of claim 1, wherein the resultant image is a depth image representing a distance to the subject and the background.

8. The imaging device of claim 1, wherein the image signal processor comprises:
a first scaler configured to downscale the first raw data before converting the first raw data into the second raw data of the frequency domain; and
a second scaler configured to upscale the low-frequency data before applying the weighting to the low-frequency data.

9. The imaging device of claim 1, wherein the sensor includes a lens disposed on a propagation path of the light reception signal, and at least a portion of the light reception signal is scattered by the lens to be re-incident into the pixels.

10. The imaging device of claim 1, wherein the image signal processor applies a Gaussian filter to the second raw data of the frequency domain, to select the low-frequency data.

11. An imaging device comprising:
a light source operating in response to an optical control signal having a predetermined frequency;
a sensor configured to generate raw data using a light reception signal output by the light source and reflected from a subject, determine a subject area of the subject of the raw data having a depth smaller than a predetermined reference depth and a background area of a background of the raw data having a depth greater than the reference depth; and an image signal processor configured to convert only the background area of the raw data into a frequency domain, to select low-frequency data within the frequency domain, to apply a weighting to the low-frequency data to reduce a magnitude of the low-frequency data, and to generate a resultant image from the low-frequency data whose magnitude was reduced and the raw data of the subject area.

12. The imaging device of claim 11, wherein the image signal processor converts at least a portion of the subject area and at least a portion of the background area of the raw data into the frequency domain to select the low-frequency data.

13. The imaging device of claim 11, wherein the image signal processor converts only at least a portion of the background area of the raw data into the frequency domain to select the low-frequency data.

14. The imaging device of claim 11, wherein the sensor includes a plurality of pixels each generating an electrical signal in response to the light reception signal, and a logic circuit configured to control the pixels, and the logic circuit inputs a plurality of control signals having phase differences from the optical control signal to the pixels, respectively, and generates the raw data using the electrical signal generated by each of the pixels, wherein each of the control signals have a regular phase difference.

15. The imaging device of claim 14, wherein among the pixels, a first pixel generates a first electrical signal in response to the light reception signal and an optical noise signal incident into the first pixel by scattering the light reception signal incident into at least one second pixel different from the first pixel, and the logic circuit generates a plurality of pieces of raw data of the first pixel using the first electrical signal generated by the first pixel.

16. The imaging device of claim 15, wherein at least one of the plurality of pieces of raw data of the first pixel includes signal data, corresponding to the light reception signal incident into the first pixel, and noise data corresponding to the optical noise signal incident into the first pixel and a ratio of a magnitude of the signal data to a magnitude of the noise data is different from each other in at least a portion of the plurality of pieces of raw data of the first pixel.

17. The imaging device of claim 16, wherein the magnitude of the signal data is greater than the magnitude of the noise data when the first pixel is included in the subject area, and the magnitude of the signal data is smaller than the magnitude of the noise data when the first pixel is included in the background area.

18. An imaging device comprising:
a pixel array including a plurality of pixels, each pixel operating in response to a first photo control signal and a second photo control signal having different phases to output a first electrical signal and a second electrical signal;
a logic circuit configured to generate raw data for generating a depth image using the first electrical signal and the second electrical signal; and
an image signal processor configured to determine a subject area of a subject in the raw data having a depth smaller than a predetermined reference depth and a background area of a background in the raw data having a depth greater than the predetermined reference depth, convert only the background area of the raw data from a spatial domain into a frequency domain and to apply a predetermined weighting to reduce a magnitude of low-frequency data of the frequency domain in a low-frequency band lower than a predetermined reference frequency, and to generate a resultant image from the low-frequency data whose magnitude was reduced and the raw data of the subject area.

19. The imaging device of claim 18, wherein the image signal processor divides the low-frequency band into a plurality of sub-bands based on the size of the low-frequency data and reduces a magnitude of the low-frequency data differently in at least a portion of the sub-bands.

* * * * *